United States Patent [19]

Neumeier

[11] E Patent Number: Re. 32,170

[45] Reissued Date of Patent: Jun. 3, 1986

[54] MACHINE-RETRIEVABLE CARD ANDCARD RETRIEVAL APPARATUS AND METHOD THEREFOR

[75] Inventor: Paul Neumeier, Loveland, Ohio

[73] Assignee: O. K. Partnership, Cincinnati, Ohio

[21] Appl. No.: 608,032

[22] Filed: May 7, 1984

Related U.S. Patent Documents

Reissue of:

[64] Patent No.: 4,330,063
Issued: May 18, 1982
Appl. No.: 125,975
Filed: Feb. 29, 1980

[51] Int. Cl.[4] ..... B07C 3/20

[52] U.S. Cl. ..... 209/608; 209/610

[58] Field of Search ..... 209/547, 608-613; 235/489, 494, 495

[56] References Cited

U.S. PATENT DOCUMENTS

| | | | |
|---|---|---|---|
| Re. 27,762 | 9/1973 | Parry et al. | 209/609 |
| 3,220,417 | 11/1965 | Gallagher | 209/608 |
| 3,738,486 | 6/1973 | Takahama et al. | 209/609 |
| 4,190,164 | 2/1980 | Matsuda | 209/610 |

*Primary Examiner*—Robert R. Reeves
*Assistant Examiner*—Edward M. Wacyra
*Attorney, Agent, or Firm*—Wood, Herron & Evans

[57] ABSTRACT

A machine-retrievable card and associated card retrieval apparatus and method therefor is disclosed in which the card is provided with a code-notched sorting edge located between the leading and trailing card edges which has (a) a predetermined configuration of complementary and primary digit code teeth which are removed and retained, respectively, to encode the card with a particular digit, and (b) an acquisition tooth at the leading edge and associated acquisition slot, and (c) a return tooth at the trailing edge and an associated notch. The card retrieval apparatus includes complementary and primary code blades which selectively engage associated complementary and primary code slots of the card, respectively, as well as a pair of acquisition blades and a pair of return blades which cooperate with the acquisition and return teeth, respectively. The blades engage the card sorting edges and shift in a specified sequence to shift the cards in stages between home, intermediate and advanced positions to thereby select a desired card from the deck.

48 Claims, 18 Drawing Figures

MACHINE-RETRIEVABLE CARD ANDCARD RETRIEVAL APPARATUS AND METHOD THEREFOR

Figure 1:
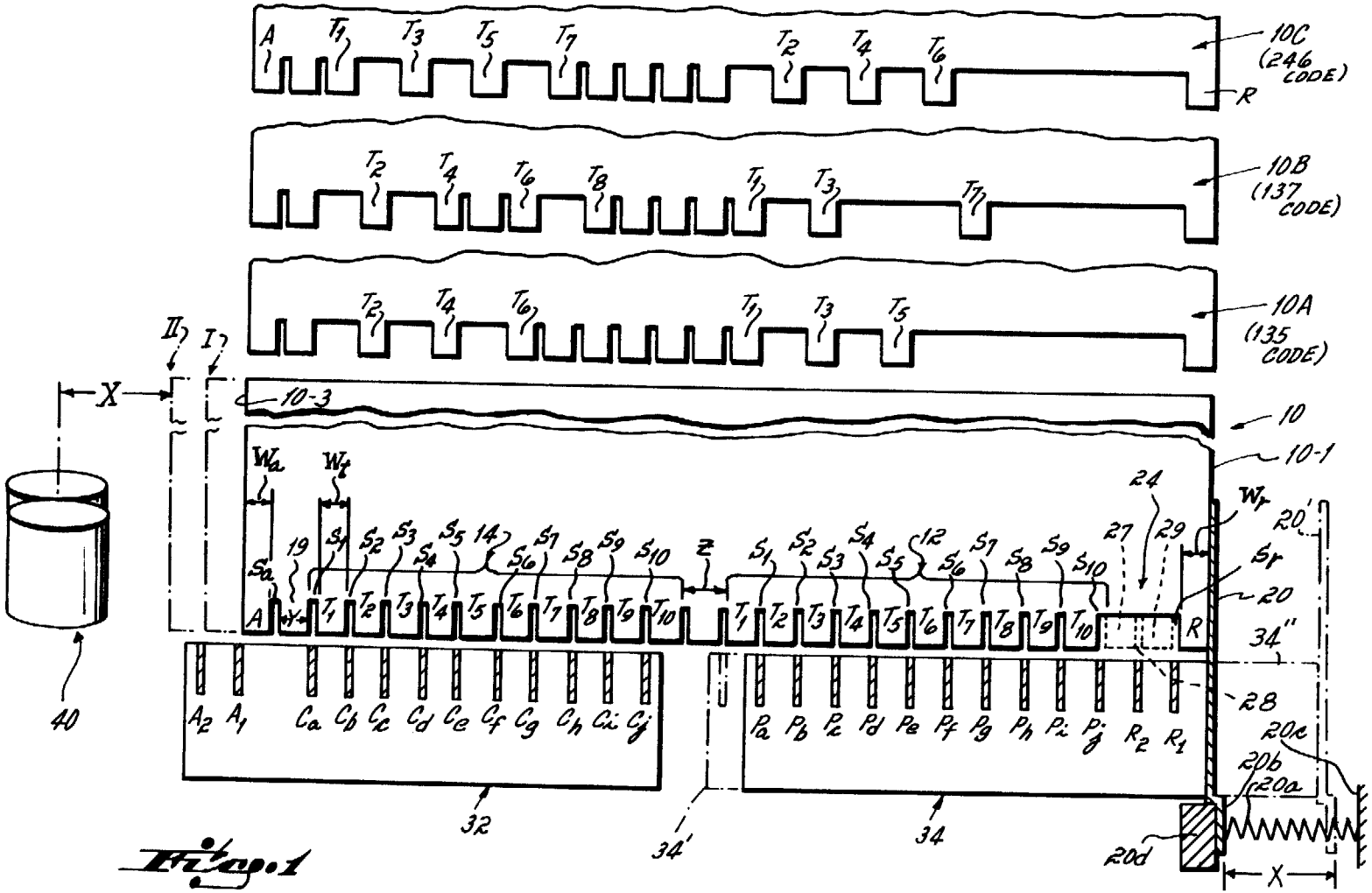
Figure 2:
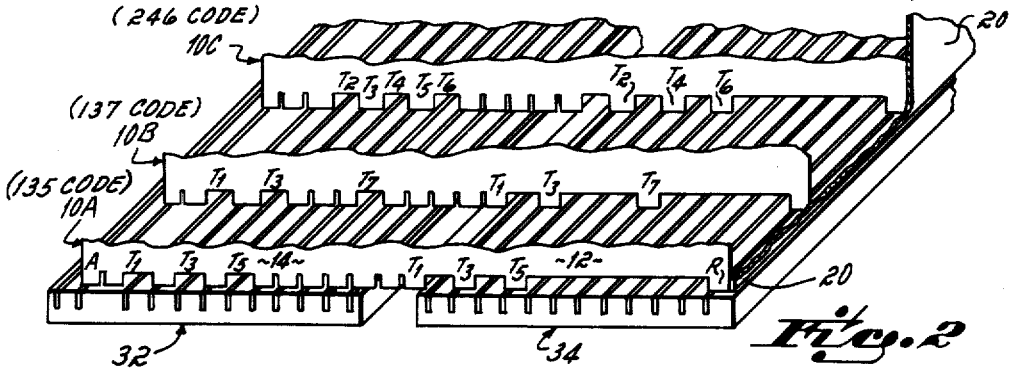

Matter enclosed in heavy brackets [ ] appears in the original patent but forms no part of this reissue specification; matter printed in italics indicates the additions made by reissue.

This invention relates to card retrieval, and more particularly to retrieval of edge-notched cards.

A variety of edge-notched card retrieval schemes have been proposed in the past. None have been entirely satisfactory for one or more reasons. For example, in some of the proposals magnetic forces are utilized to physically act upon the desired card and separate it from the undesired cards. This requires that magnetically attractable elements be affixed to each card to facilitate the application of magnetic force to the card by an electromagnet or the like to provide the necessary card separating force. This requirement unnecessarily adds to the cost of the cards and, in certain instances, increases the overall thickness of the card such that fewer cards can be stored in a card selector of given dimensions.

Another disadvantage of prior card selection proposals inheres in the fact that the selecting force applied to the desired card is not sufficiently positive to preclude a "nonsort", i.e., a failure to select a desired card, if the desired card is subjected to substantial frictional retention forces applied by adjacent cards. In other instances "missorts" result, that is, selection of an undesired card, by reason of the failure to apply sufficiently positive retention forces to undesired cards which may be acted upon by frictional forces of adjacent desired cards which are moving.

Accordingly, it has been an objective of this invention to provide a card selection system, including a card and associated card-selecting apparatus and method, which precludes nonsorts and missorts, and which further does not require utilization of mangetic forces and the attendant affixation to each card of magnetically attractive element. This objective has been accomplished in accordance with the principles of this invention by providing a card having leading and trailing edges between which is located a sorting edge, which sorting edge includes:

(a) an acquisition tooth of specified width W bounded by the leading edge of the card and an acquisition slot, (b) a return tooth of width W bounded by the trailing edge of the card and a notch of width at least 2W, (c) a complementary code region of N equally spaced removable complementary code teeth each of width W, and N equally spaced complementary slots, each located forwardly of its respectively associated complementary code tooth, and (d) a primary code region of N equally spaced removable primary code teeth each of width W, and N equally spaced primary slots, each located rearwardly of its respectively associated primary code tooth, with the rearmost complementary slot and the forwardmost primary slot being spaced apart a distance at least equal to 2W.

The cards are encodeable in an "M digit out of N digit" code format by removing complementary code teeth, and leaving primary code teeth, only at the complementary and primary code tooth locations corresponding to the M digits of the particular card code.

To effect selection of a desired coded card from a deck of similarly encoded cards, the desired and undesired cards are first located in a home position with their respective acquisition and return teeth aligned. Cards having the first code digit are then positively advanced to a partially selected position, a distance W from the home position, with a moving primary blade engaged in the primary slot of the first code digit of the desired card, while the other cards not encoded with the first code digit are positively held at the home position with a stationary complementary blade engaged in the complement slot of the first code digit.

Thereafter, cards in the partially selected [psoition] *position* having both the first and second code digits are positively advanced to the fully selected position, a distance 2W from the home position, with a moving primary blade engaged in the primary slot of the second digit of the desired card, while all cards not encoded with both the first and second code digits are positively held against movement beyond the partially selected position with a stationary complementary blade engaged in the second code digit complement slot of the desired card. At this point cards having both the first and second code digits are in the fully selected position, certain undesired cards are in the partially selected position, while other undesired cards are in the home position. All the cards, both desired and undesired, are now moved rearwardly a distance W to locate only cards having both the first and second digits at the partially selected position and all other cards at the home position.

The advancing and retracting steps described in connection with the second digit selection step are repeated for all subsequent digits of the desired card except the last digit.

The selection step for the last digit is accomplished by advancing only the desired card to the fully selected position with the moving primary blade engaged in the primary slot of the last code digit of the desired card, while positively preventing all other cards from moving to the fully selected position with a complementary blade engaged in the last code digit [complement] *complementary* slot. The desired card is displaced a distance of at least 2W from the undesired cards, preferably a distance equal to 2W+X where X is some arbitrary distance such as one inch, preliminary to removing it from the deck, by engaging a transversely disposed acquisition blade in the acquisition slot of the desired card now residing in the fully selected position and a transversely disposed return blade in the return slot of the undesired cards in the partially selected position, and while these blades are so engaged shifting them further apart at least a distance W, preferably a distance W+X, to displace the desired and undesired cards by a distance of at least 2W, preferably a distance of 2W+X. An important advantage of this approach is that the desired and undesired cards are positively acted upon by different ones of the blades to effect positive separation therebetween of at least a distance 2W, and preferably a distance of 2W+X.

In accordance with a further aspect of the invention designed to facilitate complete removal of a desired card, a transverse blade is engaged rearwardly of the return tooth of the desired card while displaced from the undesired cards a distance of at least 2W+X, and while so engaged is shifted a distance X in a direction toward the leading edge to advance the desired card a distance X to a selected card removal device located a distance X from the leading edge of a card in the fully selected position whereat the desired card alone is removed from the deck. Simultaneously, undesired cards are advanced a distance X forwardly to the home position by a moving locating plate engaged with the rear edge of the return tooth of the undesired cards. Since the undesired cards, when in the home position, are displaced a distance 2W+X from the selected card removal device, none of the undesired cards are removed from the deck. Moreover, with the desired card removed from the deck and the undesired cards at the home position, the system is ready for another card selection operation.

Figure 18:
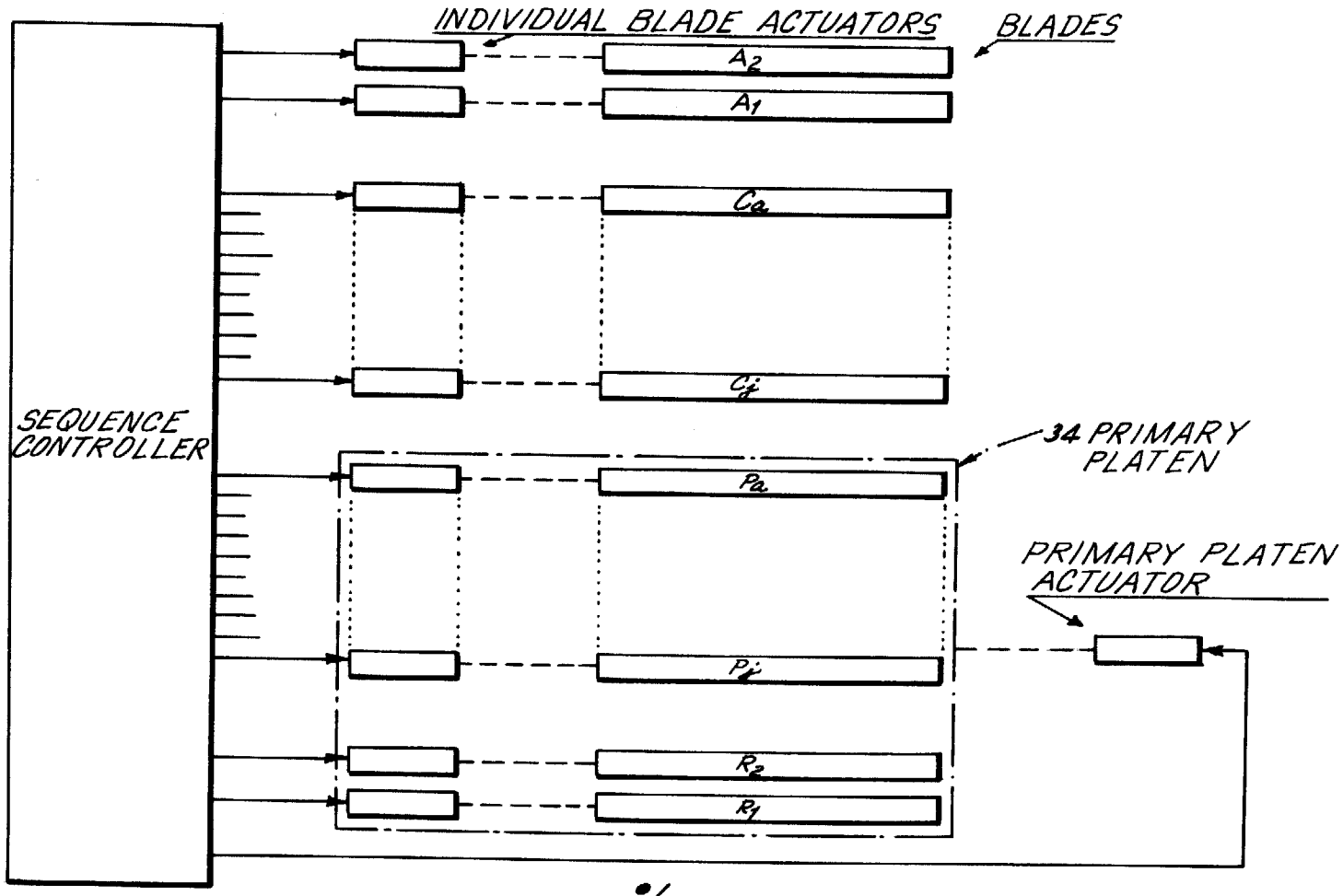

These and other features, advantages, and objectives of the invention will become more readily apparent from the detailed description thereof taken in conjunction with the drawing in which:

FIG. 1 is a side elevational view of the card selector of this invention showing the relationship of (a) the cards, (b) the associated primary and complementary selection blades, return blades, and acquisition blades, all of which are selectively elevatable relative to movable primary and complementary platens on which the cards are vertically supported along their bottom coded edge, and (c) the selected card removal device;

FIGS. 2–17 are perspective views of the card selection apparatus of this invention showing the relationship of the cards, blades and platens, and a selected card removal device during successive stages of a card selection process; and FIG. 18 is a schematic circuit, in block diagram format, of the blade and platen actuators and the sequence controller associated therewith.

The card 10 of this invention includes along one edge, termed herein the "sorting edge", which is preferably the bottom edge, a primary code region 12 and a complementary code region 14. Assuming the cards are encoded in accordance with an "M out of N" format, e.g., a "3 out of 1038 code, each of the primary and complementary code regions 12 and 14 include ten teeth $T_1, T_2, \ldots T_{10}$ of identical, although arbitrary, width $W_t$ measured in a horizontal direction, Located rightwardly of each tooth $T_1, T_2, \ldots T_{10}$ of the primary code region 12 are slots $S_1, S_2, \ldots S_{10}$ which have a width measured in the horizontal direction adapted to receive underlying vertically shiftable primary blades $P_a, P_b, \ldots P_j$ to be described in detail hereafter. The height of each slot S of the primary code region 12 measured in a vertical direction is in no sense critical, although the height should provide sufficient engagement with an underlying primary blade $P_a, P_b, \ldots P_j$ to enable horizontal movement to be imparted to a selected card in a leftwardly direction when engaged with a leftwardly moving elevated primary selector blade. For example, the slot $S_1$ of the primary code region 12 should have a vertical height which sufficiently engages an underlying elevated primary blade $P_a$ to permit a selected card to be shifted to the left, assuming the tooth $T_1$ has not been removed, when the blade $P_a$ is shifted to the left in the course of a card selection process.

Located to the left of each of the teeth $T_1, T_2, \ldots T_{10}$ of the complementary code region 14 are slots $S_1, S_2, \ldots S_{10}$. Like the slots S of primary code region 12, the slots S of the complementary code region 14 have a width measured in a horizontal direction sufficient to permit reception of an underlying selectively elevatable [complement] *complementary* blade $C_a, C_b, \ldots C_j$ of a set of complementary blades to be described hereafter in detail. The height of each slot S of the complementary code region 14 measured in a vertical direction is not critical, although the height should provide sufficient engagement with an underlying complement] *complementary* blade $C_a, C_b, \ldots C_j$ to prevent leftward movement of an undesired card when the respectively associated card [complement] *complementary* code tooth T located immediately to the right of the [complement] *complementary* slot S has not been removed. For example, the vertical height of the slot $S_1$ of complementary code region 14 should be sufficient to prevent, when [complement] *complementary* blade $C_a$ is elevated and engaged therewith, leftward movement of an undesired card when the tooth $T_1$ has not been removed.

The card 10 also includes along its sorting edge an acquisition tooth A and an associated acquisition slot $S_a$ located immediately to the right thereof. The width $W_a$ of the acquisition tooth A measured in the horizontal direction is equal to the width $W_t$ of the teeth T of the complementary code and primary code regions 14 and 12. The width measured in a horizontal direction of the acquisition slot $S_a$, like the width of the slots S of the code regions 12 and 14, is sufficient to accommodate reception of selectively elevatable acquisition blades $A_1$ and $A_2$ to be described in more detail hereafter. The spacing Y between the acquisition slot $S_a$ and the slot $S_1$ associated with tooth $T_1$ of the complementary code region 14 is arbitrary, i.e., can be any distance. In fact, distance Y could be zero such that slot $S_a$ and slot $S_1$ associated with tooth $T_1$ of complementary region 14 are the same slot. If Y is not zero, the card stock 19 between slots $S_a$ and $S_1$ of region 14 can be removed or not removed, as desired. It is essential only that when the card is in the home position, i.e., with its rear, right-hand edge 10-1 against a stationary rear locating wall 20, the front edge 10-3 of the acquisition tooth A be located immediately behind (rightwardly) of acquisition blade $A_1$ and further that acquisition blade $A_2$ be forward of blade $A_1$ by a distance $W_a'$ equal to the width $W_a$ of the acquisition tooth A such that when the card shifts leftwardly (forwardly) the width $W_t$ of one tooth T to card position "I" that blade $A_1$ underlies slot $S_a$. Stated differently, the width $W_a$ of the acquisition tooth A must equal the spacing $W_a'$ between the acquisition bars $A_1$ and $A_2$. Such an arrangement locates the acquisition slot $S_a$ over the acquisition bar $A_1$ when a selected card has been shifted leftwardly (forwardly) the width $W_t$ of a tooth T to card position I from its rightmost home position against a stationary locating plate 20, and further locates the acquisition slot $S_a$ over the acquisition blade $A_2$ when a selected card has been shifted the width of two code teeth T to the left (forwardly) from its home position, i.e., to card position "II". Acquisition blades $A_1$ and $A_2$ are never elevated simultaneously during card selection operation. Acquisition blade $A_1$ is elevated only after the first digit selection step; while acquisition blade $A_2$ is elevated only after the last digit selection step.

The card 10 also includes along its sorting edge a return tooth R having a width $W_r$ measured in the horizontal direction equal to the width $W_t$ of the teeth T of the primary and [complement] *complementary* code regions 12 and 14 and the width $W_a$ of the acquisition tooth A. The portion of the sorting edge immediately to the left of return tooth R is removed to form a slot $S_r$ to receive elevated return blades $R_1$ and $R_2$ when cards are in position I and II, respectively. This facilitates, when the primary platen 34 and its associated primary blades $P_a$, $P_b$, . . $P_j$ are in their leftmost position shown in phantom lines at 34' after a digit selecting step, to be described, the location of elevated return blade [$R_1$] $R_2$ immediately to the left of the return tooth R of a card in position II which has been shifted from home a distance of two teeth to the left, for returning said card from position II to position I such that it is shifted only one tooth width to the left of the home position when platen 34 is returned from position 34' to the home position after a digit selecting step and prior to the next selecting step. It also facilitates location of an elevated return blade [$R_2$] $R_1$ immediately to the left of the return tooth R of a card in position I which has been shifted one tooth width to the left of the home position and return of said card from position I to the home position when the platen 34 and return tooth [$R_2$] $R_1$ move from position 34' one tooth width to the right at the end of a digit selecting step. Slot 28 located between removed teeth 27 and 29 permits return blade $R_1$ to be elevated for returning cards from position I to the home position when unselected cards are in the home position, and return blade $R_2$ to be elevated when returning cards from position II to position I simultaneously with returning cards from position I to home with the $R_1$ blade.

Removal of the left half region 27 from the region 24 between slot $S_{10}$ of region 12 and slot $S_r$ permits a card in position II to be returned to position I by rightward motion of elevated return blade $R_2$ when engaged with the left edge of the return tooth R of the card being returned, without damaging a card already in the home position which, as the elevated return blade $R_2$ moves one tooth width to the right from position 34', is not moving relative to the rightwardly moving elevated return blade $R_2$. The rightmost portion 29, which has been removed from the region 24, permits elevated return blade $R_1$ to return to the home position a card in position I with its return tooth R engaged by elevated return blade $R_1$, when elevated return blade $R_1$ moves rightwardly from position 34', without damaging a card which is already in the home position.

While the left edge of region 27 and the right edge of slot $S_{10}$ may be coincident as shown in FIG. 1, they need not be. If desired, they can be spaced apart an arbitrary distance, and the card stock in the space therebetween either removed or not removed.

Summarizing, and as noted previously, a card is in the home position when it has its rear edge 10-1 seated against a locating plate 20. A card is in position I when it has been shifted leftwardly one tooth width from the home position. A card is in position II when it has been shifted leftwardly two teeth width from the home position. In the home position the acquisition tooth A is displaced immediately rightwardly relative to acquisition blade $A_1$. In position I the acquisition tooth A of the card is located immediately to the left of the acquisition blade $A_1$ such that when the $A_1$ blade is elevated it will prevent rightward movement of a card in the position I. When a card is in the position II the acquisition tooth A of the card is immediately to the left of the $A_2$ acquisition blade to prevent rightward movement of the card when acquisition blade $A_2$ is elevated. Stated differently, the function of the acquisition blade $A_2$, when elevated, is to hold a card in position II against rightward movement, while the function of the acquisition blade $A_1$, when elevated, is to hold a card in position I against rightward movement.

The function of return blade $R_1$, when elevated, is to return a card to the home position from the position I. The function of return blade $R_2$, when elevated, is to return to position I a card which is in position II. Removal of the leftmost region 27 from the region 24 permits the return blade $R_2$ to return a card from position II to position I without damaging a card which is in the home position. Removal of the rightmost region 29 from the region 24 of the card permits the return blade $R_1$ to return a card from position I to the home position without damaging a card which is already in the home position. The slot $S_r$ immediately to the left of the return tooth R permits positioning, immediately to the left of the return tooth, the return blade $R_2$ when the card is in position II and the return blade $R_1$ when the card is in position I.

The distance Z between card code regions 12 and 14 can be anything, even zero, providing it avoids mechanical interference between platens 32 and 34 when platen 34 is in position 34'. The distance between the rearmost complementary slot $S_{10}$ and the forwardmost primary slot $S_1$ must at least equal 2W.

To encode a card with a particular digit, the tooth of the primary code region 12 corresponding to that digit is not removed while the tooth of the complementary code region 14 corresponding to the digit to be coded is removed. For example, if a card is to be encoded with the digit "5", tooth $T_5$ of the primary code region 12 is not removed, while tooth $T_5$ of the complementary code region 14 is removed. Similarly, to encode a card with the digit "3", the primary code tooth $T_3$ remains and the complementary code tooth $T_3$ is removed. Similarly, to code a card with the digit "1", the primary code tooth $T_1$ remains, and the complementary code tooth $T_1$ is removed. Thus, a card, such as card 10A, encoded with the digits 1-3-5 in accordance with a "3 out of 10 " format has only teeth $T_1$, $T_3$, and $T_5$ in the primary code region 12 and has teeth removed from the complementary code region 14 only in complementary code position $T_1$, $T_3$, and $T_5$. Stated differently, to encode a card with a particular series of digits the card is notched, that is, code teeth T are removed, such that only code teeth T corresponding to the code digits remain in the primary code region, and code teeth T in the complementary code region remain in all code locations except those corresponding to the digit for which card coding is desired. Thus, when a card is coded, for every code location having a tooth T present in the primary code region 12, a tooth T is missing in the complementary code region 14 and vice versa.

Card 10B is encoded with the digits 1-3-7 and card 10C with the digits 2-4-6.

The apparatus of the invention includes the complementary platen 32 which is stationary, and the primary platen 34 which is movable. The complementary platen 32 contains, in a system operating in an M out of N format, N complementary blades $C_a$, $C_b$, . . . $C_n$. In a system such as shown in the preferred embodiment utilizing a "3 out of 10" code format, there are 10 complementary blades $C_a$, $C_b$, . . . $C_j$. The complementary blades $C_a$, $C_b$, . . . $C_j$ are disposed such that they underlie the blade slots $S_1$ . . . $S_{10}$ of the complementary code region 14 of a card in the home position. Obviously, when a card has been shifted to position I during the card selection process in a manner to become more apparent hereafter, the slots $S_1$ . . . $S_{10}$ of the complementary code region 14 are displaced leftwardly the width $W_t$ of one tooth T relative to the complementary code region slots $S_1 \ldots S_{10}$ are displaced leftwardly blades $C_a \ldots C_j$. When a card is in position II complementary the width of two teeth relative to the complementary blades $C_a \ldots C_j$. The function of the complementary blades $C_a \ldots C_j$ is to prevent leftward movement of cards which are not coded to correspond to the desired card, that is, to restrain leftward movement of undesired cards which do not contain notches or removed teeth in the complementary code region at those digit positions corresponding to the digits of the desired card undergoing selection.

Figure 5:
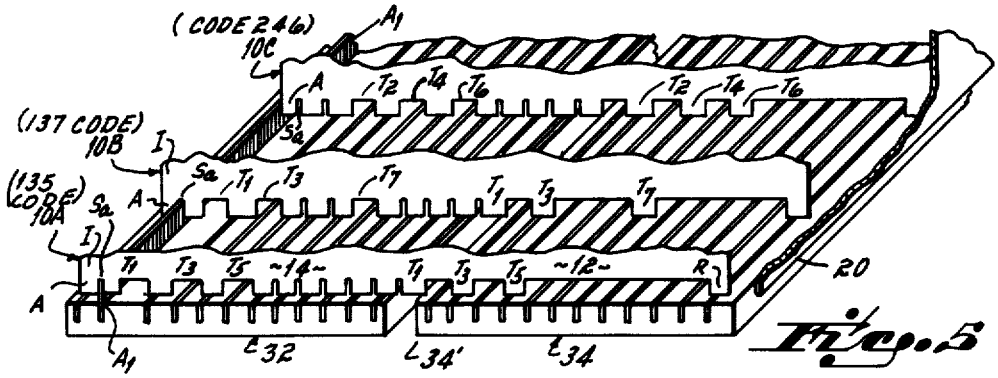
Figure 6:
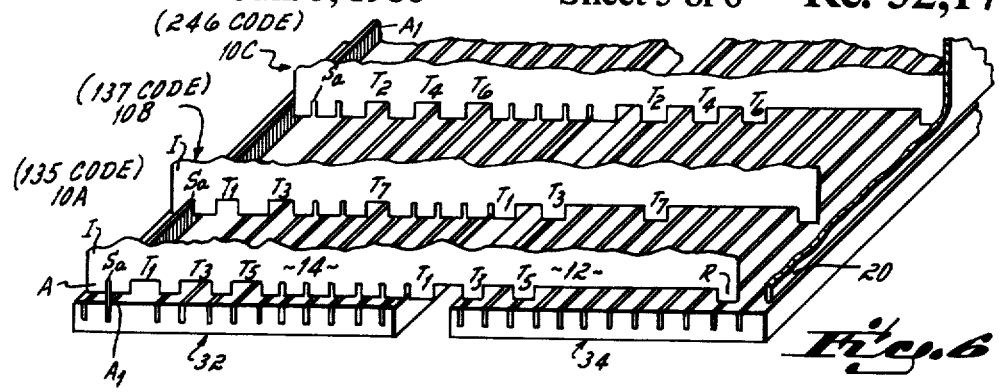
Figure 13:
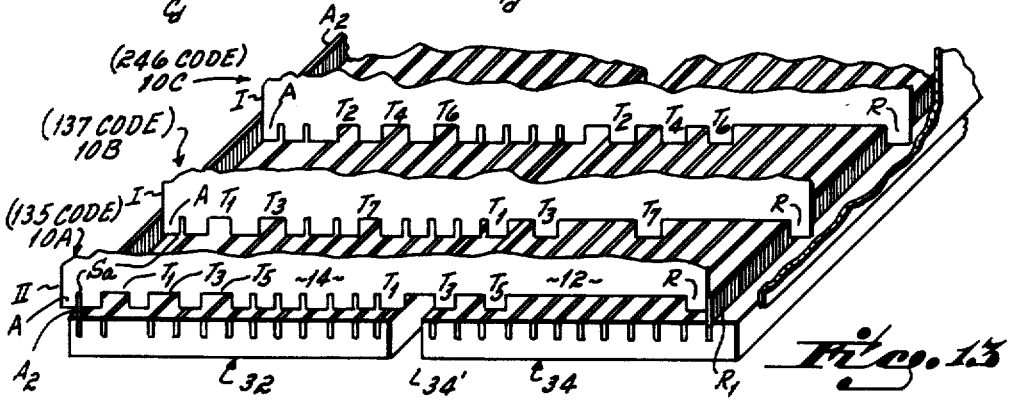
Figure 14:
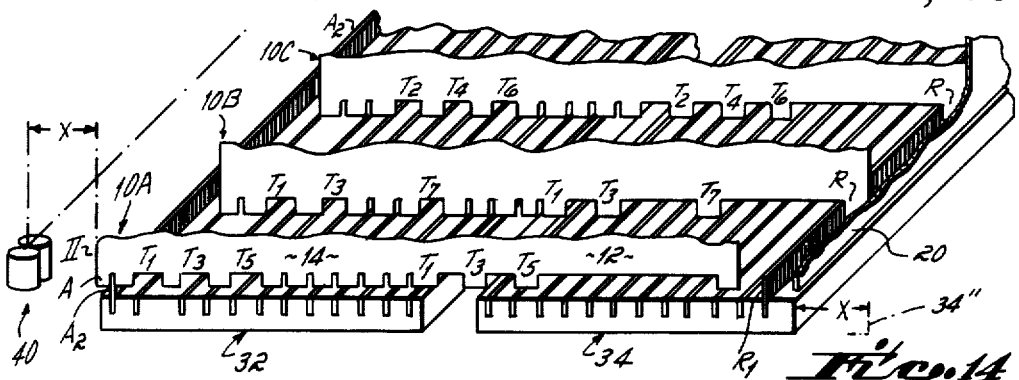
Figure 15:
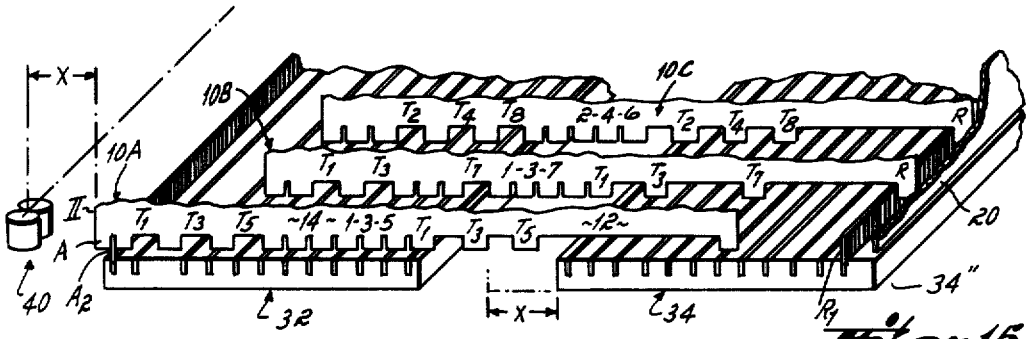

The complementary platen 32 also contains acquisition bars $A_1$ and $A_2$. As previously discussed, the acquisition bar $A_2$ when elevated into the acquisition slot $S_a$ of the desired card in position II holds such card against rightward movement when undesired cards in position I are being returned to the home position by rightward movement of the return bar $R_1$ at the conclusion of the last digit selection step, as shown in FIGS. 13–15. The acquisition blade $A_1$ holds a selected card in position I while the movable platen 34 moves rightwardly with all blades thereof in its retracted position, which occurs between the first and second digit selection steps, as shown in FIGS. 5 and 6.

The movable primary platen 34 contains N primary selection blades in an "M out of N" code system. If, as in the preferred embodiment, N equals ten, there are ten primary blades $P_a \ldots P_j$. The movable primary platen 34 is shiftable leftwardly from a home position in which blades $P_a \ldots P_j$ underlie blade slots $S_1 \ldots S_{10}$ of the primary code region 12 of a card in the home position with its edge 10-1 against plate 20 to position 34' displaced leftwardly the width of one tooth. In addition to shifting between the home position and a position displaced leftwardly from the home position the width of one tooth, the movable primary platen 34 also shifts from the home position rightwardly a predetermined distance X for reasons to be described hereafter.

Figure 9:
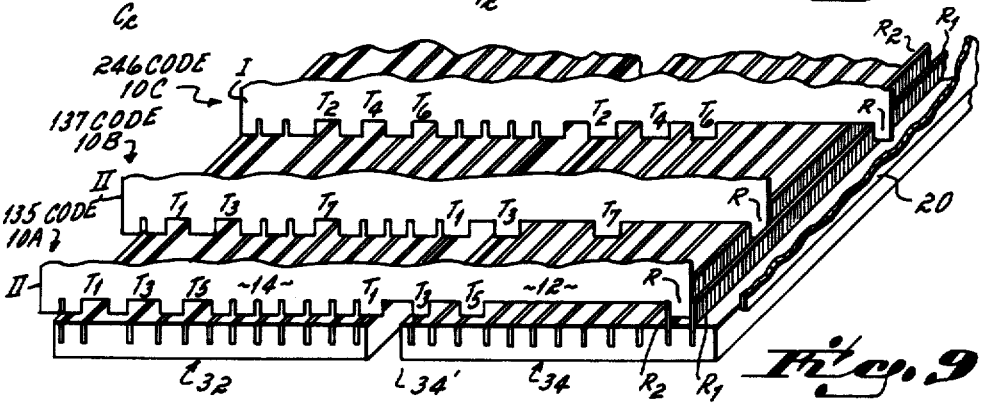
Figure 10:
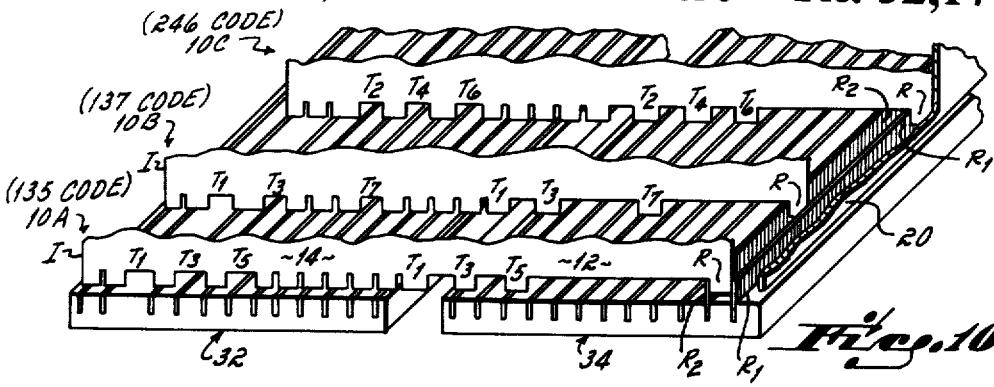
Figure 11:
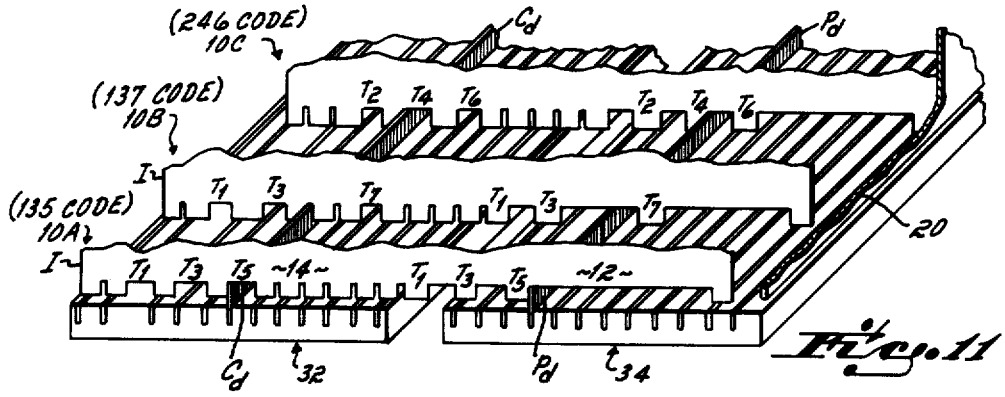

The movable primary platen 34 also contains the previously described return blades $R_1$ and $R_2$. Return blade $R_2$ is displaced rightwardly from the rightmost primary blade $P_j$ by the width of one tooth while the return blade $R_1$ is located rightwardly of the rightmost primary blade $P_j$ by a distance equal to the width of two teeth. When the primary platen 34 is in its leftmost position 34', the blade $R_1$ is positioned under the slot $S_r$ to the left of the return tooth R of cards in the position I, and is operative, when the movable platen is thereafter shifted rightwardly the width of one tooth to the home position to return undesired cards to the home position from position I, which occurs after each and every digit selection operation subsequent to the second digit selection operation (see FIGS. 9 and 10 and FIGS. 13 and 14). The return blade $R_2$, when the movable platen 34 is in its leftmost position, underlies the slot $S_r$ to the left of the return tooth R of the desired cards in position II, and functions to return such desired cards in position II to position I when the movable [platent] *platen* shifts from its left position 34' to the home position, which occurs following all digit selection operations except the first and last, as shown in FIGS. 9 and 10.

The movable platen 34 is also movable, as noted previously, between the home position and position 34'' rightwardly a distance X of the home position. In a manner to be described hereafter, when the primary platen 34 is displaced rightwardly following selection of the desired card from the home position by a distance X while holding the desired card stationary with acquisition blade $A_2$, the resulting separation between the desired card and undesired card, initially a distance of 2W, is extended to a distance of 2W+X. Thereafter, when the movable platen is returned to its home position with the primary blade located behind the return tooth of the desired card in an elevated position, the entire deck of cards is shifted leftwardly a distance X by the locating plate 20 and/or elevated primary blade *located directly behind the return tooth R of the desired card* . This effectively moves the selected card in position II, which is now displaced from the undesired cards by a distance of 2W+X, leftwardly from position II to a position a distance X to the left of position II, and returns the undesired cards to the home position.

Also included in the card selection apparatus of this invention is a selected card removal device 40. The device 40 is positioned a distance X from the position occupied by the leading edge 10-3 of a selected card located in position II. As a consequence of the location of the selected card removal device 40 in the manner described, during the selection process when partially selected cards are periodically located in position II, the partially selected cards are not advanced sufficiently to be engaged by the device 40. However, at the conclusion of the card selection operation when the desired card is in position II and the undesired cards are in the home position and the movable platen is sequentially shifted rightwardly a distance X to its rightmost position 34'' and thence leftwardly a distance X to its home position, the desired card is moved leftwardly a distance X to bring the desired card from the position II leftwardly a distance X where it can be removed by the device 40. Undesired cards which are displaced rightwardly with respect to the desired card by the width of two teeth at the end of the card selection operation, even though displaced from the home position rightwardly a distance X and then leftwardly therefrom a distance X, are not removed by the device 40 since they are never leftward of the home position, i.e., they are always displaced rightwardly from the device 40 by a distance of at least X following selection of the desired card even though the desired card is moved to device 40.

Locating plate 20 is mounted to move with platen 34 during movement of platen 34 between home position and a position 20' displaced rightwardly a distance X from home position. A compression spring 20a between the lower end 20b of plate 20 and a stationary wall 20c enables the plate 20 to follow or track movement of platen 34 over range X between home position and position 34''. Plate 20 is prevented from moving leftwardly of home position when platen 34 moves to position 34' by reason of a stationary abutment 20d located adjacent the left side of plate end 20b when the platen 34 is in its home position and the plate 20 is in its solid line position.

With reference to FIGS. 2–17 a typical card selection operation will be described in which a card 10A encoded with the digits 1-3-5 is desired to be selected from among a group of undesired cards including undesired cards 10B and 10C encoded with the digits 1-3-7 and 2-4-6.At the start of a card selection operation all the cards of the deck are urged rearwardly (rightwardly as viewed) in FIGS. 2–7) such that their rearmost vertical edge 10-1 is seated against locating plate 20. Additionally, the primary platen 34 is in its home position.

With the platens located as described, acquisition bar $A_1$ is located immediately forward of the leading edge 10-3 of all the cards, that is, immediately forward of the acquisition tooth A of all the cards. Acquisition blade $A_2$ is spaced a distance of one tooth width to the left, that is, forwardly, of the leading edge 10-3 of the cards. Additionally, complementary blades $C_a \ldots C_j$ underlie complementary slots $S_1 \ldots S_{10}$, respectively, of complementary code region 14. Primary blades $P_a \ldots P_j$ underlie primary slots $S_1 \ldots S_{10}$ of primary code region 12. Return blade $R_1$ underlies slot $S_r$ immediately to the left of return tooth R of the cards. Return blade $R_2$ underlies the midpoint 28 of the removed card region 24. The leading edge 10-3 of all cards are displaced rightwardly a distance $X+2W$ of the selected card removal device 40. The foregoing relationship of the cards with respect to the various blades of the selector and the selected card removal device is shown clearly in FIG. 2.

Following placement of all the cards in the home position, the primary and complementary blades underlying the slots S of the first digit of the encoded card desired are elevated. In the illustration given in which the desired card is encoded with the digits 1-3-5, complementary blade $C_a$ underlying slot $S_1$ associated with digit 1 of the complementary code region 14 is elevated, as is primary blade $P_a$ which underlies slot $S_1$ of the primary code region 12 associated with the digit 1. With these blades elevated, and in particular with reference to FIG. 3, it will be noted that the desired card 1-3-5 has its code tooth $T_1$ of the complementary region 14 removed, which will permit this card to move forwardly one tooth width relative to cards which do not have tooth $T_1$ of the complementary code region removed. Additionally, note that the desired card 1-3-5 -does not have code tooth $T_1$ of the primary region removed. As a consequence, the elevated primary blade $P_a$ in slot $S_1$ of the primary region 12 can urge the desired card 1-3-5 leftwardly when the primary platen 34 is shifted to the left to the position 34' shown in FIG. 4.

Figure 3:
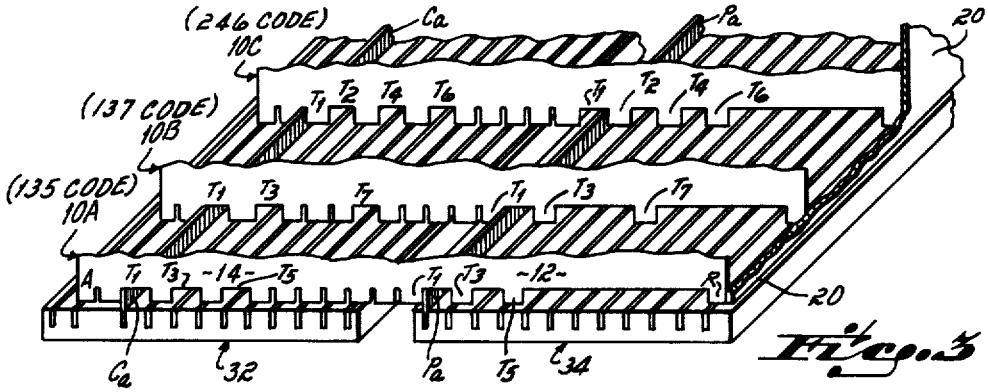

Also with reference to FIG. 3, note that an undesired card which does not contain the digit 1, such as card 2-4-6, will not be shifted leftwardly by the elevated primary blade $P_a$ when the platen moves from home to position 34' by reason of the fact that its primary code tooth $T_1$ has been removed. Also note that undesired card 2-4-6 is positively prevented from moving leftwardly when the platen 34' with its elevated blade $P_a$ shifts to position 34' by reason of the fact complementary code tooth 1 of card 2-4-6 has not been removed and is disposed rearwardly, that is, to the right, of elevated complementary blade $C_a$.

Finally, note that undesired card 1-3-7, since it is encoded with the digit 1, does have its complementary code tooth $T_1$ removed and its primary code tooth $T_1$ in place. Accordingly, and to this extent, undesired card 1-3-7 and desired card 1-3-5 are the same, and accordingly the undesired card 1-3-7 will be partially selected, that is, shifted leftwardly the width of one tooth to a partially selected position, position I, along with the desired card 1-3-5 when the primary platen 34 with blade $P_a$ elevated is shifted leftwardly from home to position 34'.

Figure 4:
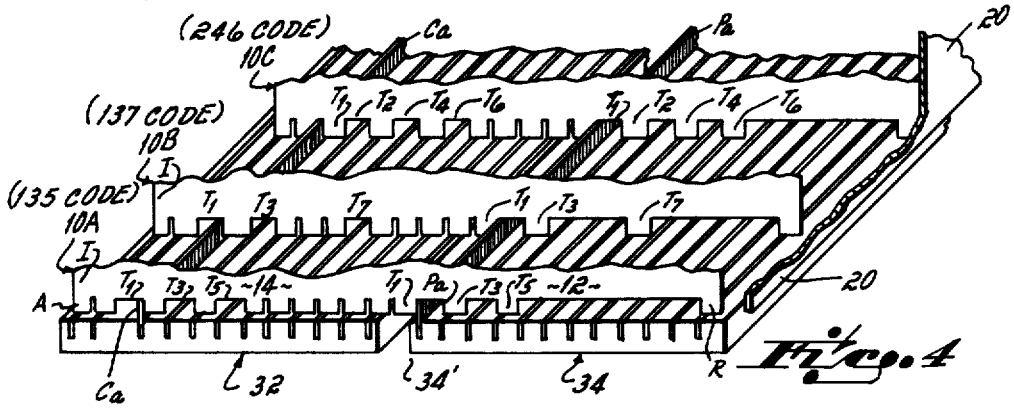

As shown in FIG. 4, the primary platen 34 with blade $P_a$ elevated is shifted from home to position 34' a distance $W_t$. This advances a distance equal to the width of one code tooth all cards encoded with the digit1, including the desired card 1-3-5 and the undesired card 1-3-7, locating such cards in position I, i.e., the partially selected position. All undesired cards not containing a 1, such as undesired card 2-4-6, are positively restrained in the home position against movement by elevated complementary blade $C_a$ engaged in slot $S_1$ of the complementary code region 14 of the undesired cards not containing the digit 1. No cards are in the fully selected position, position II, displaced a distance $2W_t$ from home.

With the desired and undesired cards in the positions just described, and with reference to FIG. 5, the acquisition blade $A_1$ is elevated into the acquisition slot $S_a$ of all of the cards containing the digit 1 which are advanced to position I, that is, the partially selected position, during the first digit selection step, namely, cards 1-3-5 and cards 1-3-7. These partially selected cards containing the digits 1, 1-3-5 and 1-3-7, are now positively held in position I by engagement of their selectively associated acquisition slots $S_a$ by the elevated acquisition bar $A_1$. The undesired card 2-4-6 which does not contain the digit 1, and which remained in the home position, has its leading edge 10-3 rearwardly (rightwardly) of the elevated acquisition bar $A_1$. In addition to elevating the acquisition bar $A_1$ to positively "acquire," that is, to positively hold against movement the desired cards 1-3-5 and 1-3-7 containing the digit 1, the primary blade $P_a$ and complementary blade $C_a$, which were elevated previously to effect the first digit selection operation for the digit 1, are now returned to their normal unelevated position.

With the cards 1-3-5 and 1-3-7 held against movement by the elevated acquisition bar $A_1$ and the blades of the primary platen 34 in their lowered normal position, the primary platen is returned from partially selected position 34' to home position, as shown in FIG. 6. At this point the first digit selection step is complete and the selection operation for the next step is initiated.

Figure 7:
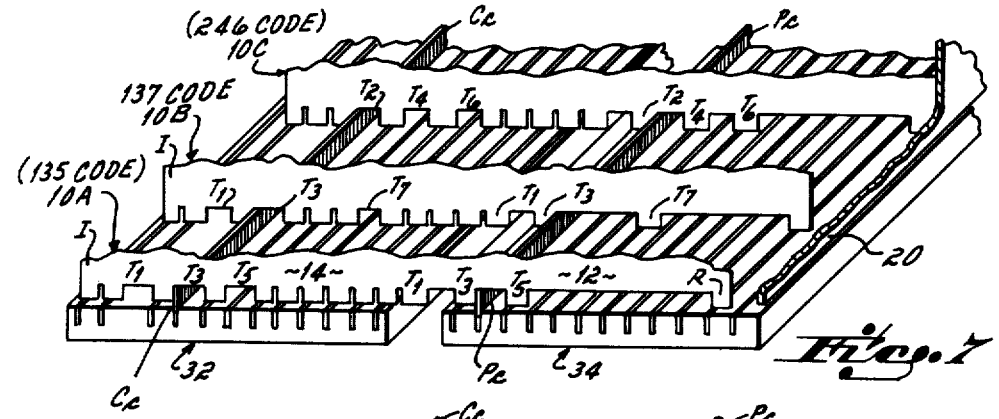

Specifically, and with reference to FIG. 7, the second digit selection step, which in this case is the digit 3, is initiated by elevating the complementary balde $C_b$ underlying the slot $S_3$ fo the complementary code region associated with the code digit 3 of the desired partially selected card in position 1 and elevating the primary blade $P_b$ underlying slot $S_3$ associated with primary code digit 3 of the desired card in partially selected position I. With complementary blade $C_b$ elevated, cards encoded with the digit 3 have their complementary code tooth $T_3$ removed and as such are not positively held against forward, or leftward, selection movement by elevated [complement] *complementary* blade $C_b$. Similarly, desired cards encoded with the digit 3 have their primary code tooth $T_3$ in place forwardly, leftwardly, of the elevated primary blade $P_b$ with engages slot $S_3$ of the partially selected cards located in position I, allowing these cards to move from position I to position II when the primary platen shifts to position 34' shown in FIG. 8 from the position in FIG. 7.

Also observe with reference to FIG. 7 that undesired card 2-4-6 which was not moved to position 1 at the conclusion of the first digit selection operation for the digit 1, but which remained in the home position, has its primary code tooth $T_2$, which is unremoved, located immediately forward or leftward of the elevated primary blade $P_b$, and its complementary code tooth $T_2$, which is located immediately rearwardly or rightwardly of elevated complementary blade $C_b$, removed.

Figure 8:
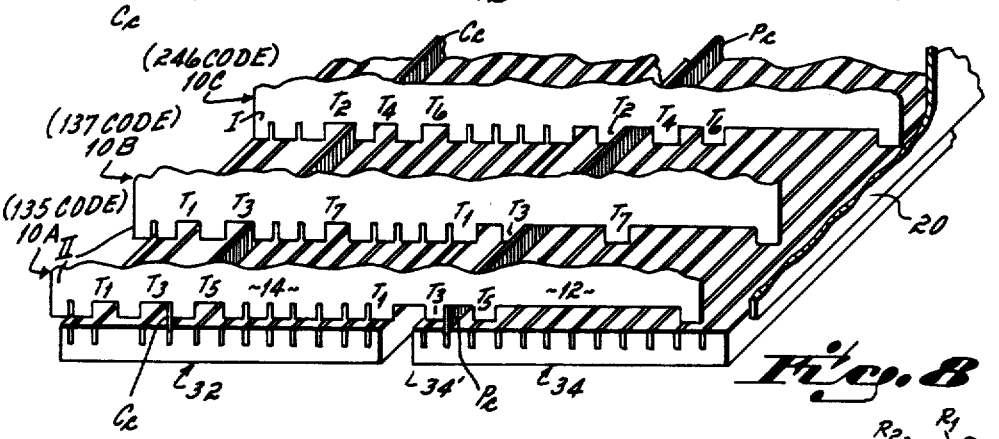

As such, when the primary platen 34 with its blade $P_b$ elevated, shifts from the home position shown in FIG. 7 to position 34' shown in FIG. 8, undesired card 2-4-6 will be shifted one tooth width leftwardly from the home position to partially selected position I.

Of course, when the primary platen 34 shifts from the position shown in FIG. 7 to position 34' shown in FIG. 8, the desired card 1-3-5 which was in position I shifts to position II as does undesired card 1-3-7 which was also in position I and, like desired card 1-3-5, contains digits 1 and 3. Thus, at the conclusion of the leftward shifting motion of the platen in the second digit selection step, for digit 3, the desired card 1-3-5 and the undesired card 1-3-7 are both in position II since each card contains digits 1 and 3. The undesired card 2-4-6 not containing both a digit [2] *3* and a digit 1 is in position I.

Complementary blade $C_b$ and primary blade $P_b$ are now lowered and return blades $R_1$ and $R_2$ are elevated, as shown in FIG. 9. Note that elevated return blade $R_2$ is located in slot $S_r$ immediately forwardly (leftwardly) of return tooth R of cards in position II containing the digits 1 and 3, such as desired card 1-3-5 and undesired card 1-3-7. As such, when the movable platen 34 is returned from position 34' shown in FIG. 9 to its home position shown in FIG. 10, those cards in position II containing both the digits 1 and 3 will be returned to position I. Also note that the undesired card containing neither the digit 1 nor the digit 3, such as undesired card 2-4-6 which is in position I, has elevated return bar $R_1$ located in slot $S_r$ immediately forward (leftward) of return tooth R. As a consequence, when the platen 34 is shifted from position 34' shown in FIG. 9 to the home position shown in FIG. 10, undesired card 2-4-6 will be shifted rightwardly from position I to the home position with its trailing edge 10-1 seated against locating plate 20. To conclude the second digit selection step, the movable platen 34 is shifted from position 34' shown in FIG. 9 to its home position shown in FIG. 10 with return bars $R_1$ and $R_2$ elevated. This places all cards not having both the digits 1 and 3, such as undesired card 2-4-6, in the home position and shifts from position II to position I all cards having both of the digits selected to this point in the selection process, namely, both digits 1 and 3. At this point there are no cards in position II.

The third digit selection step is initiated by elevating [complement] *complementary* blade $C_d$ which underlies digit 5 [complement] *complementary* slot $S_5$ of the desired card 1-3-5 located in position I and elevating the primary blade $P_d$ underlying digit 5 primary slot $S_5$ of the desired card 1-3-5 located in position I. With these blades elevated, and with reference to FIG. 11, [complement] *complementary* code tooth $T_5$ of the desired card 1-3-5 is removed which will permit the desired card 1-3-5 to move leftwardly from position I to position II. Also note that the desired card 1-3-5 has primary code tooth $T_5$, located immediately leftwardly of elevated blade $P_d$, unremoved, which will enable desired card 1-3-5 to be moved leftwardly when the movable platen 34 shifts from the position shown in FIG. 11 to the position shown in FIG. 12 with its blade $P_d$ elevated.

Also note that at this point undesired card 1-3-7 has its [complement] *complementary* code tooth $T_5$ in place immediately rightwardly of elevated [complement] *complementary* blade $C_d$, thereby preventing movement of card 1-3-7 when the primary platen 34, with blade $P_d$ elevated, shifts leftwardly. Also note that undesired card 1-3-7 has no tooth immediately forwardly (leftwardly) of elevated blade $P_d$ corresponding to the digit 5. As such, the card 1-3-7 is not positively urged leftwardly when the platen 34 shifts to position 34' with blade $P_d$ elevated.

Further note that undesired card 2-4-6 has its [complement] *complementary* code tooth $T_5$ removed. Since undesired card 2-4-6 is in the home position with [complement] *complementary* code tooth $T_5$ removed, undesired card 2-4-6 will shift forwardly when the platen 34 shifts to position 34' and elevated primary blade $P_d$ urges primary tooth $T_4$ of undesired card 2-4-6 leftwardly.

Figure 12:
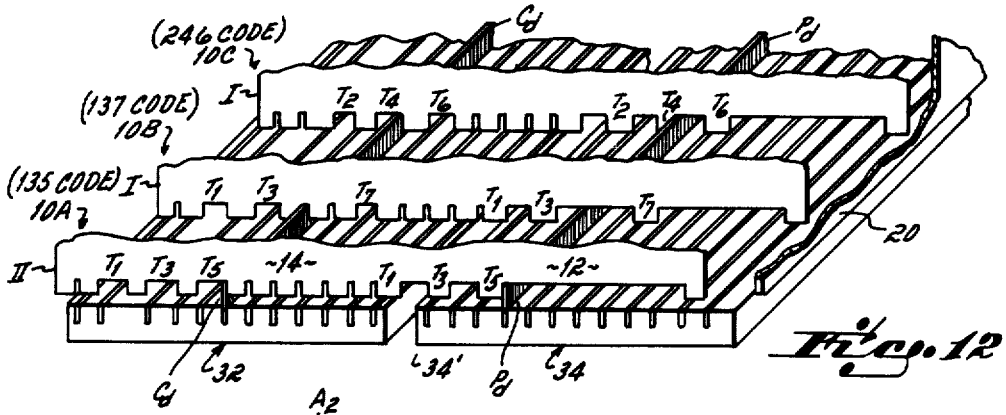

Accordingly, and as shown in FIG. 12, when the platen 34 with blade $P_d$ elevated shifts to position 34' shown in FIG. 12, the desired card 1-3-5 moves from position I to position II; the undesired card 2-4-6 moves from the home position to position I, and the undesired card 1-3-7 remains in position I. Thus, only the desired card containing digits 1, 3 and 5, namely, card 1-3-5, is in position II; all others are either in position I, such as card 1-3-7 and card 2-4-6. The desired card 1-3-5 is at this point advanced one tooth width from the undesired cards, such as card 1-3-7 and card 2-4-6.

To advance the desired card 1-3-5 a width of two teeth relative to the undesired cards, the acquistion blade $A_2$ which underlies the acquistion slot $S_a$ of the desired card 1-3-5 is elevated. Since only the desired card 1-3-5 is in position II with its acquisition slot $S_a$ overlying acquisition blade $A_2$, only the desired card 1-3-5 is acquired by the elevated acquisition bar $A_2$. The undesired cards, such as 1-3-7 and 2-4-6, which are in position I, have their leading edges 10-3 located rearwardly (rightwardly) of the elevated acquisition blade $A_2$.

In addition to elevating the acquisition blade $A_2$, the return blade $R_1$ is elevated, as shown in FIG. 13. Elevated return blade $R_1$ is rearwardly (rightwardly) relative to return tooth R of the desired card 1-3-5 in position II, while elevated return blade $R_1$ is located forwardly (leftwardly) of return tooth R of the undesired cards, such as cards 1-3-7 and 2-4-6, which are located in position I. As such these undesired cards, which as noted previously were not acquired by elevated acquisition blade $A_2$, will be returned to the home position when the platen 34 shifts from position 34' shown in FIG. 13 to its home position shown in FIG. 14 with the return bar $R_1$ in its elevated condition.

At the conclusion of the third digit selection step, which is shown in FIG. 14, the desired card 1-3-5 is in position II, and the undesired cards, such as 1-3-7 and 2-4-6, are in the home position. As a consequence, the desired card 1-3-5 is displaced forwardly of the undesired card by a distance $2W_t$ equal to the width of two code teeth. At this point the desired card 1-3-5 is in position II, no cards are in position I, and all undesired cards are in the home position.

If the desired card had more than three code digits, the steps followed for the second code digit are repeated for the third and all subsequent digits except the last digit. The steps of the last digit selection step are the same as for the third digit selection step described.

As noted previously, the selected card removal device 40 is displaced a distance X from the leading edge of the desired card 10A coded 1-3-5 when such is located in position II. To facilitate removal by the device 40 of the selected card 10A (code 1-3-5) from the remaining undesired cards in the deck, the desired card 1-3-5 is first further separated a distance X from the undesired cards to provide a total separation of 2W+X by holding the desired card against movement and moving the undesired cards rearwardly a distance X from home, and thereafter advancing all cards leftwardly a distance X to place the desired card at device 40 for removal and return the undesired cards to home position.

To facilitate further separation by a distance X of the desired and undesired cards from the position of FIG. 14 wherein the separation is 2W to provide a total separation of 2W+X, the platen 34 is moved a distance X from the home position (FIG. 14) to the position shown in FIG. 15 with acquisition blade $A_2$ and return blade $R_1$ elevated. Plate 20 moves with platen 34 from position 20 to position 20'. Acquisition blade $A_2$ holds desired card 10A against movement in the fully selected position II a distance 2W left of home. Elevated return blade $R_1$ shifts all undesired cards to a position X rightwardly of home. The combination of the action of blades $A_2$ and $R_1$ is to further the desired and undesired cards distance X to provide a total separation of 2W×X.

Figure 16:
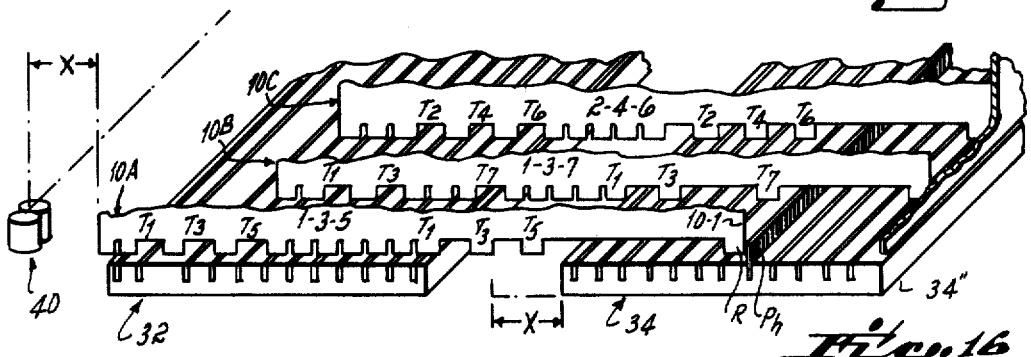
Figure 17:
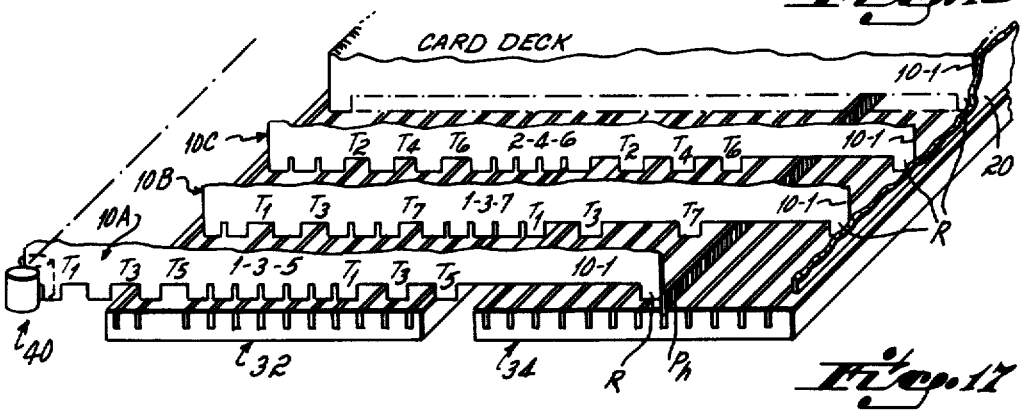

To advance the desired card 10A from position II to device 40 for removal thereby and return the undesired cards to the home position, acquisition blade $A_2$ is lowered to release the desired card 10A and primary blade $P_h$ located behind the return tooth R of the desired card 10A is elevated to push the desired card forwardly a distance X when platen 34 returns to its home position. Return blade $R_1$ is also preferably [located] *lowered* although it need not be. With the blades position as noted and shown in FIG. 16, the movable platen 34 is returned to the home position (FIG. 16). As this occurs, the undesired cards are returned to home position by the plate 20 which moves with the platen 34 from position 20' to position 20. Additionally, the desired card 10A is advanced from position II a distance X to device 40 where it is removed from the deck.

With the primary platen 34 and the undesired cards in the home position, and the desired card 1-3-5 removed by the device 40, the primary $P_h$ is lowered to its normal position, readying the apparatus for another card selection operation.

Actuators for elevating and lowering the blades may be of any desired type, and may, for example, be of the type shown in U.S. Pat. No. 3,478,877, assigned to the assignee of this invention, incorporated herein by express reference thereto, which utilizes solenoids to reciprocate the blades longitudinally in the course of which travel inclined cam surfaces thereon ride up or down, depending upon the direction of reciprocation, on a stationary cam member, raising or lowering the blade. Likewise, reciprocation of the movable platen 34 between its various positions can be effected in any desired manner such as utilization of selectively energized solenoids, rotating cam and follower arrangements, etc. For example, a cam/follower similar to that shown in U.S. Pat. No. 3,478,877 for moving the drawer therein can be used to move platen 34.

Energization of the actuators for the selectively elevatable blades and the translating movable platen 34 on a coordinated basis to effect selection of a desired card from the deck and advancement of it to the selected card removal device 40 can be under control of any suitable sequence controller for programming device, mechanical or electrical, including a programmed microprocessor. A suitable circuit, in block diagram format, is shown in FIG. 18. Similarly, the selected card removal device 40 may take any desired form such as a pair of rotatable nip rolls 40a and 40b rotating in the directions shown in FIG. 1, or a vacuum-operated card pickup device which reciprocates along a path parallel to the blades with its vacuum card pickup element appropriately located to contact and remove a selected card when advanced a distance X from position II.

Having described the invention, what is claimed is:

1. A card selection system comprising:

a plurality of cards supported in face-to-face relation in a deck, each card having leading and trailing edges between which is located a sorting edge along which are provided:

(a) an acquisition tooth of specified width W bounded by said leading edge and an acquisition slot, (b) a return tooth of width W bounded by said trailing edge and a notch of width at least 2W, (c) a complementary code region of N equally spaced removable complementary code teeth each of width W, said complementary code region also including N equally spaced complementary slots with each complementary slot being located forwardly of its associated complementary code tooth, (d) a primary code region of N equally spaced removable primary code teeth each of width W, said primary code region also including N equally spaced primary slots with each primary slot being located rearwardly of its associated primary code tooth, (e) said cards in said deck encoded in M digit out of N digit format with complementary code teeth removed, and primary code teeth remaining, only at M locations corresponding to the M digits, a card-locating member against which the cards can abut to locate said cards in a home position, a first acquisition blade disposed opposite said leading edge of said cards in said home position, said first acquisition blade being movable between engaged and disengaged positions relative to said acquisition slot of a card in a partially selected position displaced forwardly of said home position a distance W, said first acquisition blade positively preventing rearward movement of a card in said partially selected position when engaged with the acquisition slot thereof, a second acquisition blade disposed parallel to said first acquisition blade and forwardly thereof a distance W, said second acquisition blade being movable between engaged and disengaged positions relative to said acquisition slot of a card in a fully selected position displaced forwardly of said home position a distance 2W, said second acquisition blade positively preventing rearward movement of a card in said fully selected position when engaged with the acquisition slot thereof, N equally spaced complementary blades, each corresponding to a different code digit, disposed parallel to said acquisition blades, said N complementary blades being disposed opposite said N complementary slots of a card in said home position, said N complementary blades being movable, one at a time, between engaged and disengaged positions relative to complementary slots aligned therewith, each of said complementary blades, when in its engaged position, positively preventing forward motion of an undesired card having an unremoved complementary code tooth rearwardly of said engaged complementary blade, N equally spaced primary blades, each corresponding to a different code digit disposed parallel to said acquisition blades, said N primary blades being disposed opposite said N primary slots of a card in said home position, said N primary blades being movable, one at a time, between engaged and disengaged positions relative to primary slots aligned therewith, said primary blades being movable forwardly from a nonselecting position to a selecting position displaced forwardly of said nonselecting position a distance W, each of said primary blades when in its engaged position and moving forwardly a distance W from its nonselecting position to its selecting position being effective to positively move forwardly a distance W a card having a primary code tooth forwardly of said engaged primary blade, a first return blade parallel to said acquisition blades and located, when in its return position, opposite the forward edge of the return tooth of a card in said partially selected position, said first return blade being movable rearwardly from its return position to a normal position displaced a distance W rearwardly of its return position, said first return blade being movable between engaged and disengaged positions relative to said notch of a card in said partially selected position, said first return blade, when simultaneously in its return and engaged positions and moving rearwardly, positively returning a card having its return tooth rearwardly of said first return blade from said partially selected position to said home position, a second return blade parallel to said acquisition blades and located, when in its return position, opposite the forward edge of the return tooth of a card in said fully selected position, said second return blade being movable rearwardly from its return position to a normal position displaced a distance W rearwardly of its return position, said second return blade being movable between engaged and disengaged positions relative to said notch of a card in said fully selected position, said second return blade, when simultaneously in its return and engaged positions and moving rearwardly, positively returning a card having its return tooth rearwardly of said second return blade from said fully selected position to said partially selected position, first selectively operable blade actuating means for selectively moving said primary, complementary, return, and acquisition blades between their engaged and disengaged positions, second selectively operable blade actuating means for selectively moving said primary and return blades between their nonselecting and selecting positions and their return and normal positions, respectively, and sequence control means for energizing said first and second blade actuators on a selective and sequential basis to positively select and displace, in M sequential digit selection steps corresponding to the sequence of M digits, a desired card forwardly a distance 2W relative to the remaining undesired cards while positively retaining undesired cards against a relative displacement of distance 2W.

2. The system of claim 1 wherein said sequence control means sequentially effects the following:

(a) engaging, while said cards are in said home position, a transversely disposed complementary code blade into the complementary code slot of the desired card corresponding to the first code digit thereof and into the complementary code slot of each undesired card which is aligned with the complementary code slot corresponding to the first digit of the desired card, (b) engaging, while said cards are in said home position, a transversely disposed primary code blade into the primary code slot of the desired card corresponding to the first code digit thereof and into the primary code slot of each undesired card which is aligned with the primary code slot corresponding to the first digit of the desired card, (c) shifting the engaged primary blade forwardly toward the leading edge of the cards a distance W to positively advance the desired card and others encoded with said first digit to [a] *said* partially selected position a distance W from said home position, while undesired cards not encoded with said first digit are positively held in *said* home position against forward motion by said engaged complementary blade, (d) engaging, while said desired card is in said partially selected position, a transversely disposed complementary code blade into the complementary code slot of the desired card corresponding to the second code digit thereof and into the complementary code slot of each undesired card which is aligned with the complementary code slot corresponding to the second digit of the desired card, (e) engaging, while said desired card is in said partially selected position, a transversely disposed primary code blade into the primary code slot of the desired card corresponding to the second code digit thereof and into the primary code slot of the undesired card which is aligned with the primary code slot corresponding to the second digit of the desired card, (f) shifting the engaged primary code blade forwardly toward the leading edge of the cards a distance W to positively advance from said partially selected position to [a] *said* fully selected position a distance 2W from said home position the desired card and others encoded with both said first and second digits, and to positively advance to said [intermediate] *partially selected position* from said home position undesired cards not encoded with both said first and second digits having a primary code tooth unremoved forward of said shifting primary blade, while undesired cards encoded with an unremoved complementary tooth rearwardly of said engaged complementary blade are positively held against motion in said home position, (g) engaging *said* first and second transversely disposed return blades into the return slot of the cards in said partially selected position and said fully selected position, respectively, and while so engaged shifting said first and second return blades rearwardly toward said trailing edge a distance W to move undesired cards not having both said first and second digit codes from said partially selected position to said home position and the desired card and other cards encoded with both said first and second digits from said fully selected position to said partially selected position, (h) repeating steps [(e), (f), (g), and (h)] *(d), (e), (f),* and *(g)* for all additional code digits except the last code digit, (i) engaging a transversely disposed complementary code blade into the complementary code slot of the desired card located in said partially selected position corresponding to the last code digit thereof and into the complementary code slot of each undesired card which is aligned with the complementary code slot corresponding to the last digit of the desired card, (j) engaging a transversely disposed primary code blade into the primary code slot of the desired card located in said partially selected position corresponding to the last code digit thereof and into the primary code slot of each undesired card which is aligned with the primary code slot corresponding to the last digit of the desired card, (k) shifting the engaged primary blade forwardly toward the leading edge of the cards a distance W to positively advance from said partially selected position to said fully selected position a distance 2W from said home position the desired card and to positively advance to said partially selected position from said home position undesired cards having a primary code tooth unremoved forward of said engaged primary blade, while undesired cards encoded with an unremoved complementary tooth rearwardly of said engaged complementary blade are positively held against motion in said home position, (l) engaging [a transversely disposed] *said second acquisition* blade into the acquisition slot of the desired card in said fully selected position, and [a transversely disposed] *said first return* into the return slot of the undesired cards in said partially selected position, and while said blades are so engaged shifting said blades further apart at least a distance W to displace said desired and undesired cards by a distance of at least 2 W, whereby said desired and undesired cards are positively acted upon by different ones of the engaged blades to effect positive separation thereof by at least a distance 2 W.

3. The system of claim 1 further including:

a selected card removal device for engaging and removing a desired card, when the desired card has moved a nonzero distance X relative to the undesired cards following displacement of desired and undesired cards a distance 2 W as an incident to the card [selected] *selection* operation, said selected card removal device being positioned forwardly of the leading edge of a card in said home position a distance X+2 W to avoid removing undesired cards temporarily located in said fully selected position during a card selection operation, and means for moving said desired card forwardly a distance X following displacement of a desired card a distance 2 W forward of said undesired cards as an incident to said card selection operation, enabling said desired card to be engaged and removed by said selected card removal device while undesired cards are not engaged and removed, said moving means being controlled by said sequence control means.

4. The system of claims 1 or 3 wherein said cards are vertically disposed with their sorting edges lowermost, said blades are horizontally disposed below and transversely relative to said cards for vertical movement during motion between said engaged and disengaged positions, said return blades move horizontally in a direction parallel to said sorting edges during motion between said return and normal positions, and said primary blades move horizontally in a direction parallel to said sorting edges during motion between said selecting and nonselecting positions.

5. A card encodeable along an edge thereof which when encoded in M digit out of N digit format can be positively displaced a distance 2 W during a card selection operation having M sequential digit selection steps from a deck of similarly coded cards which are positively held against displacement, said card comprising:

a blank of sheet stock having leading and trailing edges between which is located a sorting edge, said sorting edge including:

(a) an acquisition tooth of specified width W bounded by said leading edge and an acquisition slot, (b) a return tooth of width W bounded by said trailing edge and a notch of width at least 2 W, (c) a complementary code region of N equally spaced removable complementary code teeth each of width W, said complementary code region also including N equally spaced complementary slots with each complementary slot being located forwardly of its associated complementary code tooth, (d) a primary code region of N equally spaced removable primary code teeth each of width W, said primary code region also including N equally spaced primary slots with each primary slot being located rearwardly of its associated primary code tooth, said card being encodeable in an M digit out of N digit code format with complementary code teeth removed, and primary code teeth remaining, only at the [complement] *complementary* and primary code locations corresponding to the M digits.

6. The card of claim 5 further including a spacer tooth of width [W] *Y* located between said acquisition slot and said complementary code region.

7. The card of claim 5 further including a spacer tooth of nonzero width between said primary and complementary code regions.

8. A method of selecting a desired card encoded along a sorting edge thereof from a deck of similarly encoded undesired cards, said desired and undesired cards each including leading and trailing edges between which is located a sorting edge having:

(a) an acquisition tooth of specified width W bounded by said leading edge and an acquisition slot, (b) a return tooth of width W bounded by said trailing edge and a notch of at least width 2 W, (c) a complementary code region of N equally spaced removable complementary code teeth *each* of width W, said complementary code region also including N equally spaced complementary slots with each complementary slot being located forwardly of its associated complementary code tooth, (d) a primary code region of N equally spaced removable primary code teeth each of width W, said primary code region also including N equally spaced primary slots with each primary slot being located rearwardly of its associated primary code tooth, said desired and undesired cards being encoded in an M digit out of N digit code format with complementary code teeth removed, and primary code teeth remaining, only at complementary and primary code tooth locations corresponding to the M digits, said method comprising the steps of:

(a) locating the desired and undesired cards in a home position with their respective acquisition and return teeth aligned, (b) engaging, while said cards are in said home position, a transversely disposed complementary code blade into the complementary code slot of the desired card corresponding to the first code digit thereof and into the complementary code slot of each undesired card which is aligned with the complementary code slot corresponding to the first digit of the desired card, (c) engaging, while said cards are in said home position, a transversely disposed primary code blade into the primary code slot of the desired card corresponding to the first code digit thereof and into the primary code slot of each undesired card which is aligned with the primary code slot corresponding to the first digit of the desired card, (d) shifting the engaged primary blade forwardly toward the leading edge of the cards a distance W to positively advance the desired card and others encoded with said first digit to a partially selected position a distance W from said home position, while undesired cards not encoded with said first digit are positively held in home position against forward motion by said engaged complementary blade, (e) engaging, while said desired card is in said partially selected position, a transversely disposed complementary code blade into the complementary code slot of the desired card corresponding to the second code digit thereof and into the complementary code slot of each undesired card which is aligned with the complementary code slot corresponding to the second digit of the desired card, (f) engaging, while said desired card is in said partially selected position, a transversely disposed primary code blade into the primary code slot of the desired card corresponding to the second code digit thereof and into the primary code slot of the undesired card which is aligned with the primary code slot corresponding to the second digit of the desired card, (g) shifting the engaged primary code blade forwardly toward the leading edge of the cards a distance W to positively advance from said partially selected position to a fully selected position a distance 2 W from said home position the desired card and others encoded with both said first and second digits, and to positively advance to said [intermediate] *partially selected position* from said home position undesired cards not encoded with both said first and second digits having a primary code tooth unremoved forward of said shifting primary blade, while undesired cards encoded with an unremoved complementary tooth rearwardly of said engaged complementary blade are positively held against motion in said home position, (h) engaging first and second transversely disposed return blades into the return slot of the cards in said partially selected position and said fully selected position, respectively, and while so engaged shifting said first and second return blades rearwardly toward said trailing edge a distance W to move undesired cards not having both said first and second digit codes from said partially selected position to said home position and the desired card and other cards encoded with both said first and second digits from said fully selected position to said partially selected position, (i) repeating steps (e), (f), (g), and (h) for all additional code digits except the last code digit, (j) engaging a transversely disposed complementary code blade into the complementary code slot of the desired card located in said partially selected position corresponding to the last code digit thereof and into the complementary code slot of each undesired card which is aligned with the complementary code slot corresponding to the last digit of the desired card, (k) engaging a transversely disposed primary code blade into the primary code slot of the desired card located in said partially selected position corresponding to the last code digit thereof and into the primary code slot of each undesired card which is aligned with the primary code slot corresponding to the last digit of the desired card, (l) shifting the engaged primary blade forwardly toward the leading edge of the cards a distance W to positively advance from said partially selected position to said fully selected position a distance 2W from said home position the desired card and to positively advance to said partially selected position from said home position undesired cards having a primary code tooth unremoved foward of said engaged primary blade, while undesired cards encoded with an unremoved complementary tooth rearwardly of said engaged complementary blade are positively held against motion in said home position, (m) engaging a transversely disposed blade into the acquisition slot of the desired card in said fully selected position, and a transversely disposed blade into the return slot of undesired cards in said partially selected position, and while said blades are so engaged shifting said blades further apart at least a distance W to displace said desired and undesired cards by a distance of at least 2W, whereby said desired and undesired cards are positively acted upon by different ones of the engaged blades to effect positive separation thereof by at least a distance 2W.

9. The method of claim 8 including the further step of:

engaging a transverse blade rearwardly of the return tooth of the desired card while said desired card is displaced from the undesired cards a distance of at least 2W, and while so engaged shifting said desired card a nonzero distance X in a direction toward said leading edge to advance said desired card to a stationary selected card removal device located a distance X from the leading edge of a card in said fully selected position.

10. A method of selecting a desired card encoded along a sorting edge thereof from a deck of similarly encoded undesired cards, said desired and undesired cards each including leading and trailing edges between which is located a sorting edge having:

(a) an acquisition tooth of specified width W bounded by said leading edge and an acquisition slot, (b) a return tooth of width W bounded by said trailing edge and a notch of at least width 2W, (c) a complementary code region of N equally spaced removable complementary code teeth each of width W, said complementary code region also including N equally spaced complementary slots with each complementary slot being located forwardly of its associated complementary code tooth, (d) a primary code region of N equally spaced removable primary code teeth each of width W, said primary code region also including N equally spaced primary slots with each primary slot being located rearwardly of its associated primary code tooth, the rearmost complementary slot and the forwardmost primary slot being spaced apart a distance at least equal to 2W, said desired and undesired cards being encoded in an M digit out of N digit code format with complementary code teeth removed, and primary code teeth remaining, only at complementary and primary code tooth locations corresponding to the M digits, said method comprising the steps of:

(a) locating the desired and undesired cards in a home position with their respective acquisition and return teeth aligned, (b) positively advancing to a partially selected position a distance W from the home position, with a moving primary blade engaged in the primary slot of the first code digit, cards having the first code digit, while positively holding at the home position all other cards with a stationary complementary blade engaged in the [complement] *complementary* slot of the first code digit, (c) positively advancing to a fully selected position a distance 2W from the home position, with a moving primary blade engaged in the primary slot of the second code digit of the desired card, cards having both the first and second code digits, while positively holding at said partially selected position, with a stationary complementary blade engaged in the second code digit [complement] *complementary* slot of the desired card, all cards not encoded with both the first and second code digits, (d) retracting all cards rearwardly a distance W to locate only cards having both the first and second digits at the partially selected position and all other cards at the home position, (e) repeating steps (c) and (d) for all subsequent digits of the desired card except the last digit, (f) positively advancing only the desired card to said fully selected position with a moving primary blade engaged in the primary slot of the last code digit of the desired card, while positively preventing all other cards from moving to said fully selected position with a complementary blade engaged in the last code digit [complement] *complementary* slot, (g) engaging a transversely disposed blade into the acquisition slot of the desired card in said fully selected position, and a transversely disposed blade into the return slot of undesired cards in said partially selected position, and while said blades are so engaged shifting said blades further apart at least a distance W to displace said desired and undesired cards by a distance of at least 2W, whereby said desired and undesired cards are positively acted upon by different ones of the engaged blades to effect positive separation therebetween of at least a distance 2W.

11. The method of claim 10 including the further step of:

engaging a transverse blade rearwardly of the return tooth of the desired card while displaced from the undesired cards a distance of at least 2W, and while so engaged shifting said desired card a distance X in a direction toward said leading edge to advance said desired card to a selected card removal device located a distance X from the leading edge of a card in said fully selected position.

12. The method of claim 10 wherein said blade shifting in step (g) is achieved by shifting said transverse blade engaged with said return tooth of said undesired cards rearwardly through a distance X to separate said desired and undesired cards a distance of 2W+X, said method further including the step of shifting all cards forwardly a distance X to simultaneously locate the leading edge of said desired card at a selected card removal device and return all said undesired cards to said home position ready for another card selection operation.

13. Apparatus for selecting a desired card encoded along a sorting edge thereof from a deck of similarly encoded undesired cards, said desired and undesired cards each including leading and trailing edges between which is located a sorting edge having:

(a) an acquisition tooth of specified width W bounded by said leading edge and an acquisition slot, (b) a return tooth of width W bounded by said trailing edge and a notch of at least width 2W, (c) a complementary code region of N equally spaced removable complementary code teeth each of width W, said complementary code region also including N equally spaced complementary slots with each complementary slot being located forwardly of its associated complementary code tooth, (d) a primary code region of N equally spaced removable primary code teeth each of width W, said primary code region also including N equally spaced primary slots with each primary slot being located rearwardly of its associated primary code tooth, said desired and undesired cards being encoded in an M digit out of N digit code format with complementary code teeth removed, and primary code teeth remaining, only at M locations corresponding to the M digits, said apparatus comprising:

(a) means for locating the desired and undesired cards in a home position with their respective acquisition and return teeth aligned, (b) means, including a moving primary blade engaged in the primary slot of the first code digit and a stationary complementary blade engaged in the [complement] *complementary* slot of the first code digit, for positively advancing to a partially selected position a distance W from the home position cards having the first code digit, while positively holding at the home position all other cards, (c) means, including a moving primary blade engaged in the primary slot of the second code digit of the desired card and a stationary complementary blade engaged in the second code digit [complement] *complementary* slot of the desired card, for positively advancing to a fully selected position a distance 2W from the home position cards encoded with both said first and second digits, while positively holding at said partially selected position all cards not encoded with both the first and second code digits, (d) means for retracting all cards rearwardly a distance W to locate only cards having both the first and second digits at the partially selected position and all other cards at the home position, (e) means, including a moving primary blade engaged in the primary slot of the last code digit of the desired card and a stationary [complement] *complementary* blade engaged in the [complement] *complementary* slot of the last digit of the desired card, for positively advancing only the desired card to said fully selected position and positively restraining all other cards against movement to said fully selected position, (f) a transversely disposed acquisition blade engaged with the acquisition slot of the desired card in said fully selected position and a transversely disposed return blade engaged with the return slot of undesired cards in said partially selected position, and (g) means for shifting said acquisition and return blades apart at least a distance W to displace said desired and undesired cards by a distance of at least 2W, whereby said desired and undesired cards are positively acted upon by different ones of the engaged blades to effect positive separation therebetween of at least a distance 2W.

14. The apparatus of claim 13 further including:

a stationary selected card removal device located a distance X from the leading edge of a card in said fully selected position, a transverse blade engaged rearwardly of the desired card while displaced from the undesired cards a distance of at least 2W, means for shifting a distance X said transverse blade, when engaged rearwardly of the return tooth of the desired card while displaced from the undesired cards a distance of at least 2W, to effectively shift said desired card a distance X in a direction toward said leading edge to advance said desired card to said stationary selected card removal device located a distance X from the leading edge of a card in said fully selected position.

15. The apparatus of claim 13 further including:

a selected card removal device located a distance X forward of the leading edge of a card in said fully selected position, and means for moving said fully selected card from said fully selected position forwardly a distance X to said card removal device for removal thereby while preventing undesired cards from moving forwardly of said home position.

16. A method *of* selecting a desired card encoded along a sorting edge thereof from a deck of similarly encoded undesirable cards, said desired and undesired cards each including leading and trailing edges between which is located said sorting edge having code-bearing teeth and notches, comprising:

(a) locating the desired and undesired cards of the deck in a home position with their sorting edges aligned, (b) selectively advancing selected cards bearing a first digit a first distance relative to said home position parallel to said sorting edge to separate said selected cards from the remaining cards, (c) advancing certain of said selected cards bearing a second digit a second distance relative to said home position parallel to said sorting edge to locate said certain cards having both said first and second digits a distance form said home position equal to the sum of said first and second distances, (d) returning all said cards toward said home position a distance equal to said second distance whereby only those cards having both said first and second digits are advanced from said home position a distance equal to said first distance, and (e) selectively advancing, *from among* cards having both said first and second digits, *certain cards also bearing a third digit* a third distance relative to said home position, whereby only those selected cards having all said first, second, and third digits are advanced from said home position a distance equal to the sum of said first and third distances.

17. The method of claim 16 further including the step of returning all unselected cards not having all said first, second, and third digits to said home position to separate said selected cards from said unselected cards a distance equal to the sum of said first and third distances.

18. A card encodeable along an edge thereof which when encoded can be positively displaced from a deck of similarly encoded card which are positively held against displacement, said card comprising:

a blank of sheet stock having leading and trailing edges between which is located a sorting edge, said sorting edge including:

(a) a complementary code region having selectively removable complementary code teeth, with each complementary tooth having a complementary slot associated therewith forwardly thereof, and (b) a primary code region having selectively removable primary code teeth, with each primary tooth having a primary slot associated therewith rearwardly thereof, said card being encodeable in an M out of N digital code format with complementary code teeth removed, and primary code teeth remaining, only at the complementary and primary code locations corresponding to the M digits, an acquisition tooth on said blank having a rear edge disposed a predetermined distance rearwardly of the leading edge of said card, said rear edge of said acquisition tooth being engageable with an acquisition member transversely disposed relative to said deck when said card is advanced from said deck a distance equal to the width of two code teeth.

19. A card in accordance with claim 18 further including a return tooth on said blank having a forward edge disposed a predetermined distance forwardly of said trailing edge, and a return slot disposed forwardly of said return tooth, said forward edge of said return tooth being engageable with a return member transversely disposed relative to said deck when said card is disposed forwardly relative to said deck a distance equal to the width of one code tooth.

20. The card of claim 19 wherein said return tooth and return slot, and acquisition tooth and acquisition slot, are located on said sorting edge.

21. Apparatus for selecting desired coded edge-notched cards from a deck of similarly encoded undesired cards, comprising:

means for supporting the cards with their [supporting] *sorting* edges aligned, a first set of blades movable toward said sorting edges of said cards and shiftable forwardly parallel to said sorting edges to shift cards forwardly solely from either a single home position to a single intermediate position or from said single intermediate position to a single advanced position, and a second set of blades movable toward said sorting edges of said cards for holding against movement undesired cards solely in either said single intermediate position or in said single home position.

22. The apparatus of claim 21 further including means for holding cards in [an] *said* advanced position, and means shiftable rearwardly to said single intermediate and home positions, for returning cards from said advanced position to said intermediate position, and from said intermediate position to said home position.

23. The apparatus of claim 22 further including means shifting said returning means rearwardly beyond said home position while selected cards in said advanced position are restricted against movement by said holding means to further separate said selected desired cards from undesired cards, and for thereafter shifting said returning means to said home position while said selected desired cards are shifted forwardly for removal from said deck.

24. The apparatus of claim 21 for selecting desired coded edge-notched cards from a deck of similarly encoded undesired cards, wherein said card supporting means includes first and second platens disposed to engage said sorting edges of said cards and which also support said first and second sets of blades, respectively.

25. The apparatus of claim 24 further comprising means for acquiring cards advanced by said first platen.

26. Apparatus in accordance with claim 24 further comprising:

means for returning cards selected by movement of said first platen from said advanced position to said intermediate position, and from said intermediate position to said home position.

27. The apparatus of claim 26 further comprising means for holding cards advanced by said first platen while said returning means returns undesired cards from said intermediate position to said home position.

28. The apparatus of claim 26 further comprising means for moving said first platen rearwardly beyond said home position and thereafter advancing it to said home position, said returning means being mounted for movement with said first platen for further separating selected desired cards from undesired cards as said first platen moves rearwardly beyond said home position.

29. In a method of selecting a desired card encoded along a sorting edge thereof from a deck of similarly encoded undesirable cards, said desired and undesired cards each including leading and trailing edges between which is located said sorting edge having code-bearing teeth and notches, comprising:

(a) locating the desired and undesired cards of the deck in a home position with their sorting edges aligned, (b) shifting selected cards bearing a first code in a direction parallel to said sorting edge to an advanced position to separate them from cards not so encoded, (c) returning the selected cards toward the home position to an intermediate position between said advanced and home positions, and (d) thereafter again shifting selected cards bearing a second code in a direction parallel to said sorting edge a predetermined distance, whereby cards bearing said first and second codes are spaced from said home position a greater distance than cards not so encoded.

30. A card encodeable along an edge thereof which when encoded can be positively displaced from a deck of similarly encoded cards which are positively held against displacement, said card comprising:

a blank of sheet stock having leading and trailing edges between which is located a sorting edge, said sorting edge including:

(a) a complementary code region having selectively removable complementary code teeth, with each complementary tooth having a complementary slot associated therewith forwardly thereof, and (b) a primary code region having selective removable primary code teeth, with each primary tooth having a primary slot associated therewith rearwardly thereof, said card being encodeable in an M out of N digital code format with complementary code teeth removed, and primary code teeth remaining, only at the complementary and primary code locations corresponding to the M digits, a return tooth on said blank having a forward edge disposed a predetermined distance forwardly of said trailing edge, and a return slot disposed forwardly of said return tooth, said forward edge of said return tooth being engageable with a return member transversely disposed relative to said deck when said card is disposed forwardly relative to said deck a distance equal to the width of one code tooth.

*31. A method of selecting a desired card encoded along a sorting edge thereof from a deck of similarly encoded undesired cards, said desired and undesired cards each including leading and trailing edges between which is located said sorting edge having code-bearing teeth and notches, comprising:*

*(a) combining the desired and undesired cards into a single deck with their sorting edges aligned;*

*(b) introducing a sorting element, which is disposed transversely relative to the sorting edges of the desired and undesired cards, into the notch of all the cards associated with the first encoded digit of the desired card and separating the single deck of cards into only (1) a first group containing only cards which each are encoded with the first digit and (2) a second group containing only the remaining cards which each are not encoded with said first digit, the first and second groups being physically separated from each other in a direction parallel to said sorting edges thereof a distance equal to the width of one tooth;*

*(c) introducing a sorting element transversely disposed to the sorting edges of all cards into the notch associated with the second encoded digit of the desired card located in the first group and selectively separating the first and second groups of cards into only (1) a third group containing cards which each are encoded with*

*both the first digit and the second digit, and (2) a fourth group collectively containing the remaining cards which do not each contain both the first and second encoded digits, the fourth group consisting of only two subgroups of cards which are separated relative to each other a distance equal to the width of one tooth in a direction parallel to their respective sorting edges, said third group of cards being separated from each of said two subgroups of the fourth group a distance of at least one tooth width in a direction parallel to the sorting edges thereof;*

*(d) combining the two subgroups of the fourth group of cards into a single combined fourth group of cards, said combined fourth group of cards being spaced from the third group of cards by at least one tooth width in a direction parallel to the sorting edges thereof; and*

*(e) introducing a sorting element disposed transversely relative to the sorting edges of the cards into the notch associated with the third encoded digit of the desired card located in the third group and separating the third group of cards and the combined fourth group of cards into only (1) a fifth group containing cards each having all three of the encoded first, second, and third digits and (2) a sixth group containing the remainder of the cards, the sixth group consisting of only two subgroups spaced relative to each other one tooth width apart in a direction parallel to the sorting edges thereof, said two subgroups of said sixth group collectively containing all cards not each having all said first, second, and third encoded digits, said fifth group of cards being spaced from each of the two subgroups of the sixth group by a distance equal to at least one tooth width in a direction parallel to the sorting edges thereof.*

*32. The method of claim 31 wherein step (c) separates said third group of cards from one of said two subgroups of the fourth group by a distance of one tooth width and from the other of said two subgroups by a distance equal to the width of two teeth; wherein step (d) separates said third group and said combined fourth group by a distance equal to one tooth width; and wherein step (e) separates said fifth group of cards from one of said two subgroups of the sixth group by a distance of one tooth width and from the other of said two subgroups by a distance equal to the width of two teeth.*

*33. The method of claim 32 comprising the further steps of:*

*(f) combining into a single sixth group the two subgroups of the sixth group which collectively include all the cards which do not each have all said first, second, and third encoded digits, said single combined sixth group being spaced from the fifth group of cards which each contain all of said first, second, and third encoded digits by a distance in a direction parallel to the sorting edges thereof which is at least equal to the width of one tooth, and*

*(g) substantially separating said fifth group of cards and said combined sixth group of cards to facilitate convenient removal of said fifth group of cards from the deck of cards.*

*34. The method of claim 31 wherein each of said separating steps includes moving said sorting element in a direction parallel to said sorting edge a distance equal to the width of one tooth.*

*35. A method of selecting a desired card encoded along a sorting edge thereof from a deck of similarly encoded undesired cards, said desired and undesired cards each including leading and trailing edges between which is located said sorting edge having code-bearing teeth and notches, said cards being encoded with N digits $D_1, D_2, \ldots D_N$, comprising:*

*(a) combining the desired and undesired cards into a single deck with their sorting edges aligned;*

*(b) introducing a sorting element, which is disposed transversely relative to the sorting edges of the desired and undesired cards, into the notch of all the cards associated with the first digit $D_1$ of the desired card and separating the single deck of cards into only (1) a first group containing only cards which each are encoded with the first digit $D_1$ and (2) a second group containing only the remaining cards not encoded with said first digit $D_1$, said first and second groups being physically separated from each other in a direction parallel to said sorting edges thereof a distance equal to the width of one tooth;*

*(c) introducing a sorting element transversely disposed to the sorting edges of all cards into the notch associated with the second digit $D_2$ of the desired card located in the first group and selectively separating the first and second group of card into only (1) a third group containing cards which each are encoded with both the first digit $D_1$ and the second digit $D_2$, and (2) a fourth group collectively containing the remaining cards which do not each contain both the first and second encoded digits, $D_1$ and $D_2$, the fourth group consisting of only two subgroups of cards which are separated relative to each other a distance equal to the width of one tooth in a direction parallel to their respective sorting edges, said third group of cards being separated from one of the two subgroups of the fourth group a distance of at least one tooth width in a direction parallel to the sorting edges thereof, and being separated from the other of the two subgroups a distance at least equal to the width of two teeth;*

*(d) combining the two subgroups of the fourth group of cards into a single combined fourth group of cards, said combined fourth group of cards being spaced from the third group of cards by a distance of at least one tooth width in a direction parallel to the sorting edges thereof;*

*(e) successively repeating steps (c) and (d) with respect to digits $D_3, D_4, \ldots D_{(N-1)}$ to successively place into a single group only cards which are each encoded with digits $D_1$-$D_3$, digits $D_1$-$D_4$, . . . $D_1$-$D_{(N-1)}$, respectively, and successively place into a single combined group only cards not each encoded with the digits $D_1$-$D_3$, $D_1$-$D_4$, . . . $D_1$-$D_{(N-1)}$, respectively;*

*(f) repeating step (c) with respect to the last digit $D_N$ to place into a single group only cards which are each encoded with digits $D_1$-$D_N$, and to place the remaining cards into another group collectively containing only cards which do not each contain all N encoded digits, $D_1, D_2, \ldots D_N$, said another group consisting of only two subgroups which are separated relative to each other a distance equal to the width of at least one tooth in a direction parallel to their respective sorting edges, said single group of cards being separated from one of the two subgroups of said another group a distance of at least one tooth width in a direction parallel to the sorting edges thereof, and being separated from the other of the two subgroups a distance at least equal to the width of two teeth.*

*36. The method of claim 35 comprising the further steps of:*

(g) combining into a single group the two subgroups of said another group collectively containing all the cards which do not each have the digits $D_1$-$D_N$, said combined group being spaced a distance of at least one tooth width in a direction parallel to the sorting edges thereof relative to the group of cards which each contain all the digits $D_1$-$D_N$; and (h) substantially separating the group of cards which each contain all the digits $D_1$-$D_N$ relative to the combined group of cards which do not each contain all the digits $D_1$-$D_N$.

37. The method of claim 35 wherein each of said separating steps includes moving said sorting element in a direction parallel to said sorting edge a distance equal to the width of one tooth.

38. A card encodeable along an edge thereof which when encoded can be positively displaced relative to a deck of similarly encoded cards which are positively held against such displacement, said card comprising:

a blank of sheet stock having leading and trailing edges between which is located a sorting edge, said sorting edge including:

(a) a complementary code region having selectively removable complementary code teeth, with each complementary tooth having a complementary slot associated therewith forwardly thereof, and (b) a primary code region having selectively removable primary code teeth, with each primary tooth having a primary slot associated therewith rearwardly thereof, said card being encodable in an M out of N digit code format with complementary code teeth removed, and primary code teeth remaining, only at the complementary and primary code locations corresponding to the M digits, an acquisition tooth on said blank having a rear edge disposed a predetermined distance rearwardly of the leading edge of said card, said rear edge of said acquisition tooth being engageable with an acquisition member transversely disposed relative to said deck when said card is displaced relative to said deck a distance equal to the width of at least one code tooth.

39. A card in accordance with claim 38 further including a return tooth on said blank having a forward edge disposed a predetermined distance forwardly of said trailing edge, and a return slot disposed forwardly of said return tooth, said forward edge of said return tooth being engageable with a return member transversely disposed relative to said deck when said card is displaced relative to said deck a distance equal to the width of one code tooth.

40. The card of claim 39 wherein said return tooth and return slot, and acquisition tooth and acquistion slot, are located on said sorting edge.

41. A card encodeable along an edge thereof which when encoded can be positively displaced from a deck of similarly encoded cards which are positively held against displacement, said card comprising:

a blank of sheet stock having leading and trailing edges between which is located a sorting edge, said sorting edge including:

(a) a complementary code region having selectively removable complementary code teeth, with each complementary tooth having a complementary slot associated therewith forwardly thereof, and (b) a primary code region having selectively removable primary code teeth, with each primary tooth having a primary slot associated therewith rearwardly thereof, said card being encodeable in an M out of N digit code format with complementary code teeth removed, and primary code teeth remaining, only at the complementary and primary code locations corresponding to the M digits, and a return tooth on said blank having a forward edge disposed a predetermined distance forwardly of said trailing edge, and a return slot disposed forwardly of said return tooth, said forward edge of said return tooth being engageable with a return member transversely disposed relative to said deck when said card is displace relative to said deck a distance equal to the width of one code tooth.

42. Apparatus for facilitating selection of desired coded edge-notched cards from a deck of similarly encoded undesired cards, comprising:

means for supporting the cards with their sorting edges aligned, a first set of blades movable toward said sorting edges of said cards and shiftable in a first direction parallel to said sorting edges to shift, relative to said deck, cards in said first direction solely from either a single initial position undisplaced relative to said deck to a single intermediate position displaced one tooth width in said first direction relative to said deck, or from said single intermediate position to a single advanced position displaced in said first direction relative to said deck a distance equal to the width of two teeth, and a second set of blades movable toward said sorting edges of said cards for holding cards against movement when said first set of blades moves said cards relative to said deck.

43. The apparatus of claim 42 further including means for holding desired cards and means shiftable in a direction opposite to said first direction for returning cards displaced relative to said deck a distance equal to the width of two teeth to a position displaced relative to said deck a distance equal to the width of one tooth.

44. The apparatus of claim 42 for selecting desired coded edge-notched cards from a deck of similarly encoded undesired cards, wherein said card supporting means includes first and second platens disposed to engage said sorting edges of said cards and which also support said first and second sets of blades, respectively.

45. The apparatus of claim 42 further comprising means for acquiring cards displaced relative to said deck as a result of movement of said first platen.

46. Apparatus in accordance with claim 42 further comprising means for returning cards by movement of said first platen from a position displaced from said deck a distance of two teeth to a position displaced from said deck a distance of one tooth.

47. The apparatus of claim 46 further comprising means for holding desired cards displaced relative to said deck by movement of said first platen while said returning means returns undesired cards to a position displaced one tooth width relative to said desired cards.

48. Apparatus for facilitating selection of desired coded edge-notched cards from a deck of similarly encoded undesired cards, comprising:

means for supporting the cards with their sorting edges aligned, a first set of blades movable toward said sorting edges of said cards, a second set of blades movable toward said sorting edges of said cards, means for successively moving said first and second sets of blades relative to each other in a direction parallel to said sorting edges to successively effect relative movement between desired and undesired cards to

*separate desired cards into only a single group and undesired cards into two subgroups which are spaced from each other and from said single group of desired cards, and*

*means for combining said subgroups of undesired cards into a single group to prevent the number of subgroups from exceeding two in number notwithstanding said moving means is successively operated at least three times.*

* * * * *